US011977393B2

(12) United States Patent
Nagy et al.

(10) Patent No.: US 11,977,393 B2
(45) Date of Patent: May 7, 2024

(54) NAVIGATIONAL CONSTRAINTS FOR AUTONOMOUS VEHICLES

(71) Applicant: UATC, LLC, Pittsburgh, PA (US)

(72) Inventors: Bryan Nagy, Pittsburgh, PA (US); Jordan Romaidis, Pittsburgh, PA (US); Brett Bavar, Pittsburgh, PA (US); Julie Derence, Pittsburgh, PA (US); Marcial Hernandez, Pittsburgh, PA (US); Tashwin Khurana, Pittsburgh, PA (US)

(73) Assignee: UATC, LLC, Pittsburgh, PA (US)

( * ) Notice: Subject to any disclaimer, the term of this patent is extended or adjusted under 35 U.S.C. 154(b) by 94 days.

(21) Appl. No.: 17/144,431

(22) Filed: Jan. 8, 2021

(65) Prior Publication Data
US 2021/0124370 A1    Apr. 29, 2021

Related U.S. Application Data

(63) Continuation of application No. 15/783,391, filed on Oct. 13, 2017, now Pat. No. 10,942,525.
(Continued)

(51) Int. Cl.
G05D 1/00    (2006.01)
G08G 1/00    (2006.01)
(Continued)

(52) U.S. Cl.
CPC ......... G05D 1/0287 (2013.01); G05D 1/0088 (2013.01); G05D 1/0214 (2013.01);
(Continued)

(58) Field of Classification Search
CPC .. G05D 1/0287; G05D 1/0088; G05D 1/0214; G05D 2201/0213; G08G 1/0145;
(Continued)

(56) References Cited

U.S. PATENT DOCUMENTS 8,260,485 B1   9/2012  Meuth
8,521,352 B1   8/2013  Ferguson
(Continued)

FOREIGN PATENT DOCUMENTS

CN   107194575   9/2017
CN   107479558   12/2017
(Continued)

OTHER PUBLICATIONS

Vania de Oliviera Neves, An environment to support structural testing of autonomous vehicles, 2014, pp. 19-24, https:// ieeexplore. ieee. org/stamp/stamp.jsp?tp+ &arnumber = 7091160 (Year: 2014).
(Continued)

Primary Examiner — Truc M Do
(74) Attorney, Agent, or Firm — Dority & Manning, P.A.

(57) ABSTRACT

An autonomous vehicle can access map data comprising travel ways within a surrounding environment of the autonomous vehicle, and further access constraint data that define original navigational constraints within the map data. The vehicle can further receive constraint files comprising additional navigational constraints within the map data and modify the constraint data based on the constraint files. The vehicle can determine a travel route to a destination using composite constraint data and autonomously driver to the destination along the travel route accordingly.

20 Claims, 11 Drawing Sheets

Related U.S. Application Data

(60) Provisional application No. 62/503,798, filed on May 9, 2017.

(51) Int. Cl.
 *G08G 1/01* (2006.01)
 *G08G 1/0967* (2006.01)
 *G08G 1/0968* (2006.01)

(52) U.S. Cl.
 CPC ..... *G08G 1/0145* (2013.01); *G08G 1/096725* (2013.01); *G08G 1/096775* (2013.01); *G08G 1/096827* (2013.01); *G08G 1/09685* (2013.01); *G08G 1/207* (2013.01); *G05D 2201/0213* (2013.01)

(58) Field of Classification Search
 CPC ....... G08G 1/096725; G08G 1/096775; G08G 1/096827; G08G 1/09685; G08G 1/207
 See application file for complete search history.

(56) References Cited

U.S. PATENT DOCUMENTS

| | | | |
|---|---|---|---|
| 8,630,958 | B2 | 1/2014 | Carlsson |
| 8,825,265 | B1 * | 9/2014 | Ferguson ........... B62D 15/0255 701/26 |
| 9,494,439 | B1 | 11/2016 | Ross |
| 9,507,346 | B1 * | 11/2016 | Levinson ............ G06F 3/04847 |
| 9,612,123 | B1 | 4/2017 | Levinson |
| 9,701,020 | B1 | 7/2017 | Ebrahimi |
| 9,852,475 | B1 | 12/2017 | Konrardy |
| 9,946,531 | B1 | 4/2018 | Fields |
| 9,964,952 | B1 * | 5/2018 | Costa .................. G05D 1/0217 |
| 10,152,053 | B1 | 12/2018 | Smith |
| 10,162,355 | B2 | 12/2018 | Hayon |
| 10,395,332 | B1 | 8/2019 | Konrardy |
| 2005/0273253 | A1 | 12/2005 | Diekhans |
| 2007/0027592 | A1 | 2/2007 | Tolkacz |
| 2009/0138188 | A1 | 5/2009 | Kores |
| 2010/0036606 | A1 | 2/2010 | Jones |
| 2011/0208745 | A1 | 8/2011 | Dietsch |
| 2012/0310691 | A1 | 12/2012 | Carlsson |
| 2014/0193348 | A1 | 7/2014 | Wang |
| 2014/0214259 | A1 | 7/2014 | Trepangnier |
| 2015/0057871 | A1 | 2/2015 | Ono |
| 2015/0254986 | A1 * | 9/2015 | Fairfield ................ G08G 1/161 707/687 |
| 2015/0266490 | A1 | 9/2015 | Coelingh |
| 2015/0268058 | A1 | 9/2015 | Samarasekera |
| 2015/0336270 | A1 | 11/2015 | Storr |
| 2015/0339928 | A1 | 11/2015 | Ramanujam |
| 2016/0306960 | A1 | 10/2016 | Gajulapalli |
| 2016/0370194 | A1 | 12/2016 | Colijn |
| 2017/0123421 | A1 | 5/2017 | Kentley |
| 2017/0132117 | A1 | 5/2017 | Stefan |
| 2017/0132926 | A1 * | 5/2017 | Duale .................. G08G 1/0133 |
| 2017/0139411 | A1 | 5/2017 | Hartung |
| 2017/0191846 | A1 | 7/2017 | Chintakindi |
| 2017/0213308 | A1 | 7/2017 | Wellborn |
| 2017/0248963 | A1 | 8/2017 | Levinson |
| 2017/0262790 | A1 | 9/2017 | Khasis |
| 2017/0364090 | A1 | 12/2017 | Grufman |
| 2018/0018874 | A1 | 1/2018 | McNew |
| 2018/0033300 | A1 * | 2/2018 | Hansen ............ G08G 1/096791 |
| 2018/0052000 | A1 | 2/2018 | Larner et al. |
| 2018/0053423 | A1 | 2/2018 | Dacosta |
| 2018/0067966 | A1 | 3/2018 | Oder |
| 2018/0107770 | A1 | 4/2018 | Cahoon |
| 2018/0130095 | A1 | 5/2018 | Khoury |
| 2018/0188045 | A1 | 7/2018 | Wheeler |
| 2018/0245929 | A1 | 8/2018 | Watanabe |
| 2018/0253109 | A1 | 9/2018 | Fontaine |
| 2018/0293687 | A1 | 10/2018 | Hardee |
| 2018/0308191 | A1 | 10/2018 | Matthiesen |
| 2018/0308363 | A1 | 10/2018 | Duncan |
| 2018/0315146 | A1 | 11/2018 | Matthiesen |
| 2018/0328745 | A1 | 11/2018 | Nagy |
| 2018/0329428 | A1 | 11/2018 | Nagy |
| 2018/0339712 | A1 | 11/2018 | Kislovskiy |
| 2018/0340790 | A1 | 11/2018 | Kislovskiy |
| 2018/0341261 | A1 | 11/2018 | Kislovskiy |
| 2018/0341276 | A1 | 11/2018 | Kislovskiy |
| 2018/0341571 | A1 | 11/2018 | Kislovskiy |
| 2018/0341880 | A1 | 11/2018 | Kislovskiy |
| 2018/0341881 | A1 | 11/2018 | Kislovskiy |
| 2018/0341887 | A1 | 11/2018 | Kislovskiy |
| 2018/0341888 | A1 | 11/2018 | Kislovskiy |
| 2018/0341895 | A1 | 11/2018 | Kislovskiy |
| 2018/0342033 | A1 | 11/2018 | Kislovskiy |
| 2018/0342034 | A1 | 11/2018 | Kislovskiy |
| 2018/0342113 | A1 | 11/2018 | Kislovskiy |
| 2019/0146494 | A1 | 5/2019 | Li |
| 2019/0146513 | A1 | 5/2019 | Tomita |
| 2019/0208695 | A1 | 7/2019 | Graf Plessen |
| 2019/0325546 | A1 | 10/2019 | Hagestad |
| 2020/0104770 | A1 | 4/2020 | Aich et al. |

FOREIGN PATENT DOCUMENTS

| | | |
|---|---|---|
| WO | WO 2017/079222 | 5/2017 |
| WO | WO 2017/092904 | 8/2017 |
| WO | WO 2017/172415 | 10/2017 |
| WO | WO 2018/042853 | 3/2018 |
| WO | WO 2018/111260 | 6/2018 |
| WO | WO 2019/023324 | 1/2019 |

OTHER PUBLICATIONS

Simona Gifei, Integrated Management System for Qulity, Safety and Security in Developing Autonomous Vehicles, Mar. 2017, pp. 673-676 https:// ieeexplore.IEEE. org/stamp/stamp.jsp?tp+ & arnumber = 7905041 (Year: 2017).

ISR and Written Opinion dated Jul. 29, 2018 in PCT/US2018/033092 (UP-376WO).

Federico Giaimo, Design Criteria to Architect Continuous Experimentation for Self-Driving Vehicles, 2017, pp. 203-210, https://ieeexplore.ieee.org/ stamp/stamp.jsp?tp=&arnumber=7930218 (Year: 2017).

Philip Koopman, Autonomous Vehicle Safety: An Interdisciplinary Challenge, 2017, pp. 90-96, https://ieeexplore. ieee.org/stamp/stamp. jsp?tp= &arnumber=7823109 (Year: 2017).

Baekgyu Kim, Testing Autonomous Vehicle Software in the Virtual Prototyping Environment, 2017, pp. 5-8 https://ieeexplore.ieee.org/stamp/ stamp.jsp?tp=arnumber=7797233 (Year: 2017).

ISR and Written Opinion dated Jul. 17, 2019 in PCT/US2019\028396 (UP-728WO).

Darrell Etherington, Daimler to operate self-driving cars on Uber's network, Jan. 31, 2017.

ISR and Written Opinion dated Aug. 13, 2019 in PCT/US2019/030341 (UP-275WO).

Thimbleby, Harold, "The directed Chinese postman problem", Software Practice and Experience, 2003, vol. 33, pp. 1081-1096 (2003).

Kazemi, Leyla, "Optimal Traversal Planning in Road Networks with Navigational Constraints", Proceedings of the 15th International Symposium on Advances in Geographic Information Systems, ACMGIS '07, Nov. 7-9, 2007, Seattle, WA 8 pages (2007).

Carlsson, John Gunnar, "Practical distributed vehicle routing for street-level map Scanning", published 2009 at www.semanticscholar.org, 14 pages (2009).

Carlsson, John Gunnar, "A geometric framework for resource allocation problems", Proceedings of 2009 NSF Engineering Research and Innovation Conference (CMMI), Honolulu, Hawaii, 6 pages (2009).

Kwan, Mei-Ko, "Graphic programming using odd or even points", Chinese Mathematics (American Mathematical Society), vol. 1, pp. 273-277 (1962).

(56) References Cited

OTHER PUBLICATIONS

Edmunds, Jack "Matching, Euler tours and the Chinese Postman", Mathematical Programming 5, 88-124, North-Holland Publishing Company (1973).
Groetschel, Martin, "Euler, Mei-Ko Kwan, Koenigsberg, and a Chinese Postman", Documenta Mathematica—Extra vol. ISMP, pp. 43-50 (2012).
WRO in PCT/US2019/030341 dated May 14, 2020 (UP-275WO).
IPRP in PCT/US2019/030341 dated Aug. 4, 2020 (UP-275).
IPRP in PCT/US2019/028396 dated Oct. 29, 2020 (UP-728WO).

* cited by examiner

| | | | | 540 | 547 | 548 |
|---|---|---|---|---|---|---|
| CONSTRAINT FILES | | | | DELETE SERVICE | LICENSED COMPANIES | APPLY |
| DISTRICT | 541 | 542 | | SEARCH FILE NAME | 543 | |
| STRENGTH | | | | ENTER FILE NAME | | |

545 — CONSTRAINT FILENAME / DISTRICT / DESCRIPTION
— 2016.09 ANYCITY, LIBERTY... / PITTSBURGH

544:
| VEHICLE | ADDED | ADDED BY | APPLIED |
|---|---|---|---|
| KEYP10H0002 | 2016-22-20 15:39:29 | BRYAN | FALSE |
| MM_FUSION | 2016-22-20 17:29:15 | VEHICLE_SHARE | TRUE |

546 — 2016.09 ANYCITY, LIBERTY... / PITTSBURGH

APPLY CONSTRAINT FILES

| 582 | 584 | 586 |
|---|---|---|
| BY VEHICLE | BY FLEET | BY DISTRICT |

PLEASE SELECT VEHICLE(S) ▼
588

CANCEL | APPEND | OVERWRITE

FIG. 9

NAVIGATIONAL CONSTRAINTS FOR AUTONOMOUS VEHICLES

CROSS-REFERENCE TO RELATED APPLICATIONS

This application is a continuation of U.S. patent application Ser. No. 15/793,391, filed on Oct. 13, 2017; which claims the benefit of U.S. Provisional Application No. 62/503,798 filed May 9, 2017, the aforementioned applications being hereby incorporated by reference for all purposes.

FIELD OF THE INVENTION

The present disclosure relates generally to using navigational constraints to control the motion of an autonomous vehicle.

BACKGROUND

An autonomous vehicle is a vehicle that is capable of sensing its environment and navigating along a travel route without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path relative to a travel route through such surrounding environment.

Determination of a travel route along which an autonomous vehicle can navigate can be based at least in part on map data. However, map data is not always updated to reflect changing availability of different travel ways. In addition, map data does not always include additional information about particular events and/or conditions that may affect the navigational availability or preference of particular travel ways in a geographic area.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of controlling navigation of an autonomous vehicle. The method includes accessing, by one or more computing devices on-board an autonomous vehicle, map data descriptive of the identity and location of different travel ways within the surrounding environment of the autonomous vehicle. The method also includes accessing, by the one or more computing devices, constraint data descriptive of one or more geographic areas or geographic identifiers within the map data for which associated navigational constraints are defined. The method also includes receiving, by the one or more computing devices, one or more constraint files descriptive of additional navigational constraints for one or more geographic areas or geographic identifiers. The method also includes modifying, by the one or more computing devices, the constraint data based at least in part on the one or more constraint files to obtain composite constraint data. The method also includes determining, by the one or more computing devices, a travel route for navigating the autonomous vehicle, wherein the travel route is determined at least in part from the map data evaluated relative to the composite constraint data. The method also includes controlling, by the one or more computing devices, motion of the autonomous vehicle based at least in part on the determined travel route.

Another example aspect of the present disclosure is directed to a computing system for controlling navigation of an autonomous vehicle. The computing system includes one or more processors on-board an autonomous vehicle and one or more memory devices on-board the autonomous vehicle. The one or more memory devices store instructions that when executed by the one or more processors cause the computing system to perform operations. The operations include accessing map data descriptive of an identity and location of different travel ways within the surrounding environment of the autonomous vehicle. The operations also include receiving one or more constraint files, each constraint file including zero or more polygons, each polygon corresponding to an inclusion polygon identifying a geographic area that should be included in a permissible area for navigation by the autonomous vehicle or an exclusion polygon identifying a geographic area that should be excluded from a permissible area for navigation by the autonomous vehicle. The operations also include modifying existing constraint data based at least in part on the one or more constraint files to obtain composite constraint data. The operations also include determining a travel route for navigating the autonomous vehicle, wherein the travel route is determined at least in part from the map data evaluated relative to the composite constraint data. The operations also include controlling motion of the autonomous vehicle based at least in part on the determined travel route.

Yet another example aspect of the present disclosure is directed to an autonomous vehicle. The autonomous vehicle includes one or more communication interfaces for wirelessly communicating with one or more remote computing devices configured to control operation of a fleet of autonomous vehicles, one or more processors, and one or more non-transitory computer-readable media that collectively store instructions that, when executed by the one or more processors, cause the one or more processors to perform operations. The operations include accessing map data descriptive of the identity and location of different travel ways within the surrounding environment of the autonomous vehicle. The operations also include accessing constraint data descriptive of one or more geographic areas or geographic identifiers within the map data for which associated navigational constraints are defined. The operations also include receiving one or more constraint files descriptive of additional navigational constraints for one or more geographic areas or geographic identifiers. The operations also include modifying the constraint data based at least in part on the one or more constraint files to obtain composite constraint data. The operations also include sending a notification signal to the one or more remote computing devices, wherein the notification signal includes an acknowledgement of the one or more constraint files.

A still further example aspect of the present disclosure is directed to a remote computing device for controlling navigation of an autonomous vehicle. The remote computing device includes one or more processors and one or more memory devices that are located remotely from an autonomous vehicle. The one or more memory devices store instructions that when executed by the one or more processors cause the computing system to perform operations. The operations include creating a constraint set with zero or more geographic identifiers and a default state indicating whether to by default permit or forbid areas described by the constraint set. The operations also include identifying an event at some geographic location that will impact navigation at such location. The operations also include determining one or more geographic identifiers associated with the identified event. The operations also include assigning the one or more geographic identifiers to the constraint set. The operations also include transmitting a constraint file including the constraint set to one or more autonomous vehicles over a network.

According to various examples, the remote computing device can provide autonomous vehicles with up-to-date information of route constraints within a given region. Autonomous vehicles operating along routes can encounter blockages, such as construction zones or an otherwise closed road segment. In certain implementations, a remote computing device in communication with the autonomous vehicles can receive or access traffic flow constraint information from a road network planning or monitoring resource, such as a public works resource or local transportation department. For example, planned construction events and other scheduled road closure events may be reported and/or planned by a central planning authority. As provided herein, the central planning authority can comprise the road network monitoring resource, which can provide traffic flow constraint information to the remote computing device.

In various examples, based on the received traffic flow constraint information, the remote computing system can update the constraint data that defines whether autonomous vehicles are permitted or prevented from traveling through certain route segments. As an example, a specified road segment may be scheduled for resurfacing between a start time and completion time on a particular day. The resurfacing schedule may be posted by the central planning authority on a network-based resource, such as a website or application program. In variations, the resurfacing schedule can be manually transmitted by an employee of the central planning authority and/or manually accessed by an administrator of the remote computing device. The resurfacing schedule may then be manually inputted as constraint data for autonomous vehicles within a given region or proximity to the road segment to be resurfaced.

In certain implementations, the constraint data may be automatically updated by the remote computing device to reflect the traffic flow constraint information. For example, the remote computing device can monitor the road network planning resource of the central planning authority for any updates. Such updates can indicate the respective time or time ranges and affected road segments of a scheduled event or road closure. These events and road or lane closures can correspond to, for example, road construction, utility servicing anticipated to disrupt traffic, a protest or parade, a sporting event (e.g., a cycling race, triathlon, or marathon), a traffic accident location, a crime scene, a festival, and the like.

In some aspects, the traffic flow constraint information can be accessed or received from multiple resources, such as local event planning resources (e.g., a city government permitting resource that updates permitted events such as festivals, protests, farmer's markets, parades, etc.), road planning resources (e.g., updating planned road construction or utility servicing), and traffic monitoring resources (e.g., identifying up-to-date traffic hindrances such as traffic accidents, live traffic jams, etc.). Such resources may be centralized in nature, such as government-managed permitting and planning resources, or can be decentralized in nature, such as live, crowded-sourced data sharing of traffic information.

Based on the traffic flow constraint information accessed or received from the road planning or traffic monitoring resources, the remote computing device can update autonomy map constraints that control whether autonomous vehicles can traverse any particular road segment. In updating the constraints, the remote computing device can establish a time range for a given road segment or lane segment closure that temporally regulates autonomous vehicle access to those road or lane segments. The remote computing device may then transmit non-routable data that indicates current or future autonomy map constraints to the autonomous vehicle. In some aspects, the non-routable data (e.g., in the form of a constraint file) may be transmitted to all autonomous vehicles operating throughout a given region. In variations, the remote computing device can selectively transmit the non-routable data to autonomous vehicles on current routes that are to be affected by the road or lane segment closures.

Other example aspects of the present disclosure are directed to systems, methods, vehicles, apparatuses, tangible, non-transitory computer-readable media, user interfaces, and memory devices for using navigational constraints to control the motion of an autonomous vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 8 depicts a first example user interface for applying constraint data according to example embodiments of the present disclosure;

FIG. 9 depicts a second example user interface for applying constraint data according to example embodiments of the present disclosure;

DETAILED DESCRIPTION

Figure 1:
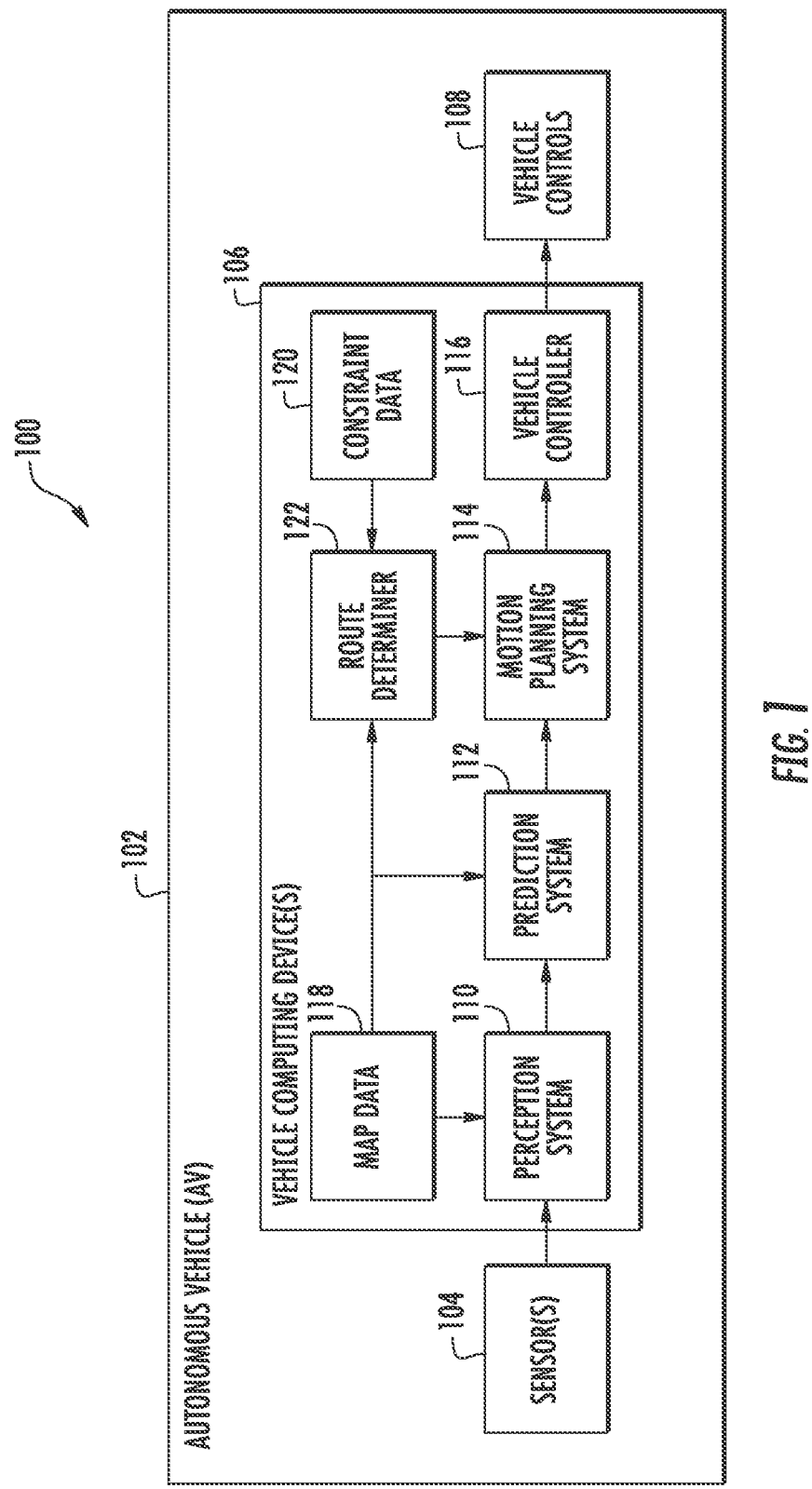
FIG. 1 depicts an example system for controlling the navigation of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods that control navigation of autonomous vehicles in accordance with constraint data that identifies geographic areas for inclusion and/or exclusion as permissible areas for navigation by the autonomous vehicles. In particular, the systems and methods of the present disclosure can obtain constraint data descriptive of one or more geographic identifiers (e.g., a polygon encompassing a geographic area and/or a travel way identifier for at least a portion of one or more lanes within a particular travel way) and an application type associated with each geographic identifier. Constraint data can be received, for example, from one or more remote computing devices configured to control operation of a fleet of autonomous vehicles. Map data descriptive of the identity and location of different travel ways within the surrounding environment of the autonomous vehicle can be accessed and evaluated relative to the constraint data in order to determine a travel route for navigating the autonomous vehicle. Motion of the autonomous vehicle then can be controlled based at least in part on the determined travel route.

The disclosed systems and methods can provide a dynamically configurable system for initializing and updating navigational constraints in order to effectively manage autonomous vehicles during specific events (e.g., a traffic accident, sporting event or street fair) and/or specific modes of operation (e.g., with or without human drivers, on-task or off-task from performing a service). In addition, the use of hierarchical constraint data in the form of inclusion and/or exclusion polygons can advantageously provide a flexible configuration for communicating and implementing navigational constraints.

More particularly, an autonomous vehicle (e.g., a ground-based vehicle, air-based vehicle, other vehicle type) can include a vehicle computing system that implements a variety of systems on-board the autonomous vehicle. For instance, the vehicle computing system can include one or more sensors (e.g., image capture devices, RADAR devices, LIDAR devices, etc.), one or more computing devices for determining autonomous navigation, and one or more vehicle control system(s) (e.g., for controlling braking, steering, powertrain). The sensor(s) can be configured to obtain sensor data used to detect object(s) including, for example, pedestrians that are located within the travel route (e.g., road) of the autonomous vehicle, travelling in an adjacent travel way (e.g., on a sidewalk, a running path), etc. The sensor data can be indicative of locations associated with the object(s) within the surrounding environment of the autonomous vehicle at one or more time(s). The sensor data can be provided to one or more computing devices in the vehicle computing system.

In addition to the sensor data, the vehicle computing system can retrieve, access, or otherwise obtain map data that provides other detailed information about the surrounding environment of the autonomous vehicle. The map data can provide information regarding the identity and location of different travel ways (e.g., roads, road segments, lanes, lane segments, parking lanes, turning lanes, bicycle lanes, or other portions of a particular travel way). In some examples, travel way portions within accessed map data can include one or more descriptors including, for example, a district identifier, a travel way portion identifier, a start point for the travel way portion, an end point for the travel way portion, a directionality (e.g., direction of traffic flow), and/or connectivity identifiers for other travel way portions that are predecessors and/or successors to a given travel way portion. Map data can also include the identity and location of different items than travel ways, including but not limited to buildings, maintenance/service locations for the autonomous vehicles, parking areas, traffic signs, traffic lights, traffic control devices, and/or any other map data that provides information that assists the vehicle computing system in comprehending and perceiving its surrounding environment and its relationship thereto.

The vehicle computing system can be configured to determine travel routes for the autonomous vehicle based at least in part on the map data. In some examples, travel routes can be determined in accordance with a navigational objective (e.g., traveling to a destination location to perform a service such as a rideshare service, delivery service, courier service, etc.). Because autonomy systems can rely on computer-based determination of travel routes as opposed to human determination, it can sometimes be desirable to implement constraints on particular travel areas that should be either included and/or excluded as permissible for navigation. For example, it may be desirable to exclude specific areas or specific travel ways within an area due to events such as a traffic accident, street fair, construction, or the like. Specific areas may be included as permissible for navigation by particular autonomous vehicles that are assigned to perform services in a given area, thus affording efficient distribution of fleet resources.

In order to implement dynamic navigational constraints, constraint data can provide information descriptive of one or more geographic areas and/or geographic identifiers within map data for which associated navigational constraints are defined. In some examples, the navigational constraints can indicate those areas that should be included and/or excluded from permissible areas for navigation by an autonomous vehicle. In some examples, existing constraint data can be provided at and obtained by one or more computing devices located on-board an autonomous vehicle. In some examples, the constraint data can be received from one or more remote computing devices configured to control operation of a fleet of autonomous vehicles. Constraint data can be the same for some or all vehicles in a fleet, or it can be customized per vehicle depending on factors such as the operation location, operating mode, etc. of each autonomous vehicle.

Constraint data can be provided in a variety of suitable formats for evaluation by an autonomous vehicle relative to accessible map data. In some implementations, constraint data can be descriptive of one or more geographic identifiers and an application type associated with each of the one or more geographic identifiers. Geographic identifiers can include, for example, one or more polygons encompassing a geographic area, one or more travel way identifiers indicative of at least a portion of one or more lanes within a particular travel way, or other identifiers. In some instances, the application type can indicate either that an associated geographic area can be included in a permissible area for navigation by the autonomous vehicle or that it should be excluded from a permissible area for navigation by the autonomous vehicle.

For example, the application type associated each geographic identifier can be selected from a predetermined group of application types (e.g., complete inclusion, partial inclusion, complete exclusion, partial exclusion, etc.). In another example, the application type can be selected as a value from within a range of possible application type values (e.g., a number selected from within a range of 0-10 with 0 being least permissible or least preferred and 10 being most permissible or most preferred). In another example, an application type can correspond to an associated cost factor for navigating in a particular geographic area. One or more computing devices associated with an autonomous vehicle can evaluate the associated cost to determine a travel route that minimizes a total cost based at least in part on the cost factor associated with the application type as well as optional additional cost factors, cost functions or the like. Depending on the manner of application type, travel routes can be determined that not only can exclude particular areas from navigation but that additionally or alternatively can reduce traffic in particular areas based at least in part on evaluation of the constraint data.

The use of polygonal constraint data is an example approach that provides a highly flexible manner of defining constraints. Instead of having to list out numerous different travel way portion identifiers for inclusion or exclusion in a given area, polygons can be created to more broadly define geographic areas for inclusion and/or exclusion. The number of vertices, number of edges, and/or overall shape of a polygon encompassing a particular geographic area can be customized in numerous ways to accomplish specific navigational constraint objectives. In addition, polygons can be assigned to a constraint set characterized by a default state (e.g., inclusion for permitted travel, exclusion for forbidden travel). By using polygonal constraint data, multiple travel way portions can be determined as included and/or excluded based on the location and application type associated with each polygon and the default state for the constraint set containing each polygon. For instance, permitted travel way portions can be determined as those travel way portions that are described by a constraint set having a default "permit" state and/or that are completely enclosed by a complete inclusion polygon and/or that are completely enclosed or partially touched by a partial inclusion polygon. Forbidden travel way portions can be determined as those travel way portions that are described by a constraint set having a default "forbid" state and/or that are completely enclosed by a complete exclusion polygon and/or that are completely enclosed or partially touched by a partial exclusion polygon.

In some examples, constraint data can be determined, evaluated or otherwise considered by a vehicle computing system based on a current mode of operation for an autonomous vehicle. Different modes of operation can include, for example, a fully autonomous mode in which the autonomous vehicle operates without a human driver present in the vehicle, an autonomous mode in which the autonomous vehicle operates with a human driver in the vehicle, or other modes. In some implementations, constraint data can include a priori map constraints identifying that an autonomous vehicle should be excluded from making a left hand turn in particular turn lanes of a given travel way or travel way portion when a vehicle is operating in a particular mode. Different modes of operation can additionally or alternatively include, for example, whether a vehicle is currently engaged or not engaged in performing a service. For instance, some vehicles may currently have passengers on board that are being driven from one location to another, while other vehicles may be engaged in controlled navigation but are not currently engaged in a particular operational task. Constraint data may selectively include on-task autonomous vehicles to navigate in a particular area while excluding autonomous vehicles that are off-task.

Composite constraint data can be generated by modifying existing constraint data accessed by an autonomous vehicle based at least in part on one or more constraint files received, for example, from one or more remote computing devices remote from the autonomous vehicle. The one or more constraint files can be descriptive of additional navigational constraints for one or more geographic areas and/or geographic identifiers. For example, each constraint file may include a constraint set including zero or more geographic identifiers (e.g., polygons having boundaries defined relative to a geographic area and having an associated application type) as well as a default state indicating whether to by default permit or forbid areas described by the constraint file. The application type associated with each geographic identifier (e.g., polygon) can describe how to evaluate the geographic identifier relative to map data. For example, an inclusion type can indicate that travel way portions within map data that are enclosed or touched by an inclusion polygon should be permitted. An exclusion type can indicate that travel way portions within map data that are enclosed or touched by an exclusion polygon should be forbidden. A complete type can indicate that travel way portions within map data that are completely enclosed by a polygon should be permitted or forbidden. A partial type can indicate that travel way portions within map data that are completely enclosed or even just partially touched by a polygon should be permitted or forbidden.

After an autonomous vehicle obtains constraint data, one or more computing systems located on-board the autonomous vehicle can determine a travel route for navigating the autonomous vehicle. The travel route can be determined at least in part from map data that is evaluated relative to the composite constraint data. For example, the map data can be evaluated in association with the composite constraint data to determine which travel way portions are permitted and which travel way portions are forbidden. A travel route can be determined that never incorporates a forbidden travel way portion. The determined travel route can include, for example, a sequence of multiple travel way portions along which an autonomous vehicle can navigate, for example, to accomplish a predetermined navigational objective. Each travel way portion within a determined travel route can be defined by one or more of a travel way identifier, a start point, an end point, a directionality, and/or connectivity identifiers for predecessor and/or successor travel way portions.

Once a travel route is determined, a vehicle computing system can determine a motion plan to control motion of the autonomous vehicle along the determined travel route. The motion plan can be further based on any objects proximate to the autonomous vehicle (e.g., pedestrians, other vehicles, traffic control devices, etc.) that are detected by the vehicle's sensors, image capture devices, or other data acquisition system components. For instance, the vehicle computing system can be a computing system that includes various sub-systems that cooperate to perceive the surrounding environment of the autonomous vehicle and determine a motion plan for controlling the motion of the autonomous vehicle. For instance, the vehicle computing system can include a perception system, a prediction system, and a motion planning system.

In other implementations of the disclosed systems and methods, one or more remote computing devices can be configured to implement systems and method of controlling operation of one or more autonomous vehicles. In some examples, such remote computing device(s) can be included as part of a central control system that is in wireless communication with a plurality of autonomous vehicles, such as a fleet of autonomous vehicles providing one or more services (rideshare service, delivery service, courier service, etc.). The one or more remote computing devices can create a constraint set with zero or more geographic identifiers and a default state (e.g., permit or forbid) that indicates whether to by default permit or forbid areas described by the constraint file. The one or more remote computing devices can identify an event at some geographic location that will impact navigation at such location (e.g., a street fair, sporting event, traffic accident, etc.). The one or more remote computing devices can then determine constraint data associated with the identified event. For example, constraint data can be determined including one or more geographic identifiers such as polygons having boundaries defined relative to a geographic area including the location of the event identified. In some examples, at least one such polygon can encompass a geographic area including the location of the identified event. The one or more geographic identifiers (e.g., polygons) can include an associated application type (e.g., complete inclusion, partial inclusion, complete exclusion, partial exclusion). The one or more remote computing devices then can assign the one or more geographic identifiers to the constraint set and transmit the constraint data to one or more autonomous vehicles over a network.

Identification of events, for which the disclosed constraint data can be determined can come from data descriptive of an upcoming event (e.g., sporting event or the like) and/or historical data (e.g., by approximating navigational limitations based on past events in a particular geographic region at a certain time and/or date). The one or more remote computing devices can utilize various databases to predict, approximate, and/or determine the events and/or geographic locations of anticipated navigational limitations. For example, for different geographic regions, event information (e.g., location, time, and/or date of the event, or the like) can be stored in an event database. Event information can be indicative of whether traffic can be higher or lower at a certain time period (e.g., a time period before the event begins versus a time period when the event is ongoing). In another example, event information can come from calendar databases that indicate important dates (e.g., holidays, first days of school for a city, voting day, or the like). Other examples of outside sources or other stored data (e.g., predicted future, current and/or historic events, conditions, or the like) include weather conditions, news information (e.g., fires, emergency situations, or the like), social information (e.g., via social networking websites), traffic conditions, flight information from airports and/or airlines, or the like, or other information that can assist in determining event information, traffic patterns or other data contributing to potential navigational constraints.

The systems, methods, and vehicles described herein may provide a number of technical effects and benefits. For instance, the vehicle computing system can locally (e.g., on-board the vehicle) obtain constraint data, evaluate map data relative to the constraint data, and determine a travel route for navigating the autonomous vehicle in compliance with the constraint data. By performing such operations on-board the autonomous vehicle, the vehicle computing system can avoid certain latency issues that arise by reliance on a remote computing system for off-board operations. For example, the vehicle computing system can be configured to initialize and update its travel route(s) based on obtained constraint data and accessible map data as opposed to waiting for determined travel routes to be approved or disapproved by a central command or other remote computing device/system. As such, map data can be evaluated relative to constraint data and travel routes can be determined with increased computational efficiency.

The systems, methods, and vehicles described herein have an additional technical effect and benefit of providing a flexible and customizable approach to defining included and/or excluded geographic areas for navigation by an autonomous vehicle. By communicating constraints to an autonomous vehicle from one or more remote computing devices, a fleet operator associated with the remote computing devices is afforded flexibility in controlling navigation. Fleet operators have the flexibility of sending instructions to an entire fleet of vehicles operating in a given geographic area, to just one autonomous vehicle, or to a subset of vehicles. Fleet operators can provide inclusion areas and/or exclusion areas to an autonomous vehicle in real time or near real time to account for numerous dynamically changing events (e.g., a traffic accident, construction, or street fair) and/or specific modes of operation (e.g., operation of the autonomous vehicle with or without human drivers). This dynamic approach helps autonomous vehicles adjust their travel routes in real time or near real time without having to regenerate limitations within map data or require autonomous vehicles to return to a central command center to upload new maps.

In some implementations, polygonal constraint data can provide a highly flexible manner of defining constraints whereby geographic areas for inclusion and/or exclusion can be more broadly defined as opposed to listing out numerous specific travel way portion identifiers. Inclusion areas and/or exclusion areas can be added and/or removed from constraint data one at a time in order to provide flexible updates to one or more autonomous vehicles, thus reducing the amount of data communicated remotely to an autonomous vehicle. In addition, constraint data can be defined that is customized based on location in order to account for travel way design, operational parameters, events, etc. that are different from city to city, country to country or the like.

The systems, methods, and vehicles described herein have an additional technical effect and benefit of providing more efficient navigation while simultaneously enhancing the safety and security of autonomous vehicles, passengers and/or cargo. By providing a mechanism to obtain constraint data, autonomous vehicles can benefit from the knowledge of when and where potential problem areas may exist for travel routes. A vehicle computing system can determine optimized travel routes or update travel routes in an enhanced manner by evaluating map data relative to current constraint data in order to avoid exclusion areas. By planning ahead to avoid such areas, the potential for navigational back-tracking is reduced. In addition, by avoiding exclusion areas that are identified because of certain events (e.g., traffic accidents, protestor demonstrations, etc.), safety of vehicles, passengers, and/or cargo can be increased.

The systems, methods, and vehicles described herein also provide an improvement to vehicle computing technology, such as autonomous vehicle computing technology. For instance, aspects of the present disclosure enable a vehicle computing system to more efficiently and accurately control the vehicle's motion. By planning which travel way portions (e.g., turn lanes, narrow lanes, lanes with blind spots, etc.) that an autonomous vehicle should use or avoid based in part on obtained constraint data, motion plans can be determined in advance along an ideal travel route. Improved autonomy and effective determination of a vehicle travel route and motion plan can be a primary factor in achieving enhanced overall operation of an autonomous vehicle.

With reference now to the Figures, example embodiments of the present disclosure will be discussed in further detail. FIG. 1 depicts an example vehicle computing system 100 of an autonomous vehicle 102 according to example embodiments of the present disclosure. The autonomous vehicle 102 incorporating the vehicle computing system 100 can be a ground-based autonomous vehicle (e.g., car, truck, bus), an air-based autonomous vehicle (e.g., airplane, drone, helicopter, or other aircraft), or other type of vehicles (e.g., watercraft). The autonomous vehicle 102 can be configured to drive, navigate, operate, etc. with minimal and/or no interaction from a human driver. For example, the autonomous vehicle 102 can be configured to operate in one or more mode(s) such as, for example, a fully autonomous operational mode and/or a semi-autonomous operational mode. A fully autonomous (e.g., self-driving) operational mode can be one in which the autonomous vehicle 102 can provide driving and navigational operation with no interaction from a human driver. A semi-autonomous operational mode can be one in which the autonomous vehicle 102 can operate with some interaction from a human driver present in the vehicle. In some implementations, the autonomous vehicle 102 can be associated with an entity (e.g., a service provider) that provides one or more vehicle service(s) to a plurality of users via a fleet of vehicles that includes, for example, the autonomous vehicle 102. The vehicle service(s) can include transportation services (e.g., rideshare services), courier services, delivery services, and/or other types of services. The vehicle service(s) can transport and/or deliver passengers as well as items such as but not limited to food, animals, freight, purchased goods, etc.

As further illustrated in FIG. 1, the vehicle computing system 100 can include one or more sensors 104, one or more computing devices 106 and one or more vehicle controls 108. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel. The one or more computing devices 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102 (e.g., at one or more times).

As one example, for a LIDAR system, the sensor data from sensor(s) 104 can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data from sensor(s) 104 can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the computing device(s) 106 can retrieve or otherwise obtain map data 118 that provides detailed information about the surrounding environment of the autonomous vehicle 102. The map data can provide information regarding the identity and location of different travel ways (e.g., roads, road segments, lanes, lane segments, parking lanes, turning lanes, bicycle lanes, or other portions of a particular travel way). In some examples, travel way portions within accessed map data can include one or more descriptors including, for example, a travel way portion identifier, a start point for the travel way portion, an end point for the travel way portion, a directionality (e.g., direction of traffic flow), and/or connectivity identifiers for other travel way portions that are predecessors and/or successors to a given travel way portion. Map data can also include the identity and location of different items than travel ways, including but not limited to buildings, maintenance/service locations for the autonomous vehicles, parking areas, traffic signs, traffic lights, traffic control devices, and/or any other map data that provides information that assists the computing system in comprehending and perceiving its surrounding environment and its relationship thereto. An example depiction of map data 118 for given travel way portions is provided in FIGS. 3-4.

Referring still to FIG. 1, the computing device(s) 106 can also retrieve or otherwise obtain constraint data 120 that provides information descriptive of one or more geographic areas and/or geographic identifiers within a map for which associated navigational constraints are defined. In some examples, constraint data 120 can identify geographic areas within map data 118 that should be included and/or excluded from permissible areas (or preferred and/or not preferred) for navigation by autonomous vehicle 102. For instance, constraint data 120 can include instructions for excluding or reducing travel in specific areas or specific travel ways within an area due to events such as a traffic accident, street fair, construction, or the like. Constraint data 120 can alternatively include instructions for including specific areas or specific travel ways as permissible for navigation by particular autonomous vehicles assigned to perform services in a given area, thus affording efficient distribution of fleet resources. Additional description regarding more particular types and examples of constraint data 120 is provided relative to FIGS. 5-9.

The computing device(s) 106 can also include a route determiner 122 configured to determine travel routes for the autonomous vehicle 102 based at least in part on the map data 118 evaluated relative to the constraint data 120. In some examples, travel routes can be determined by route determiner 122 in accordance with a navigational objective (e.g., traveling to a destination location to perform a service such as rideshare service, delivery service, courier service, etc.). Route determiner 122 can evaluate the map data 118 in association with the constraint data 120 to determine which travel way portions are included and/or which travel way portions are excluded. The determined travel route can include, for example, a sequence of multiple permitted travel way portions along which an autonomous vehicle can navigate, for example, to accomplish a predetermined navigational objective. Each travel way portion within a determined travel route can be defined by one or more of a travel way identifier, a start point, an end point, directionality, and/or connectivity identifiers for predecessor and/or successor travel way portions.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information. In some implementations, the perception system 110 can determine state data for each object over a number of iterations. In particular, the perception system 110 can update the state data for each object at each iteration. Thus, the perception system 110 can detect and track objects (e.g., vehicles) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the travel route determined by route determiner 122 and/or the predicted one or more future locations for the object and/or the state data for the object provided by the perception system 110. Stated differently, given information about the current locations of objects and/or predicted future locations of proximate objects, as well as a predetermined travel route, the motion planning system 114 can determine a motion plan for the autonomous vehicle 102 that best navigates the autonomous vehicle 102 along the determined travel route relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 strikes another object and/or deviates from a preferred pathway (e.g., a predetermined travel route).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the motion plan that minimizes the cost function can be selected or otherwise determined. The motion planning system 114 can provide the selected motion plan to a vehicle controller 116 that controls one or more vehicle controls 108 (e.g., actuators or other devices that control gas flow, steering, braking, etc.) to execute the selected motion plan.

Each of the perception system 110, the prediction system 112, the motion planning system 114, the vehicle controller 116, and the route determiner 122 can include computer logic utilized to provide desired functionality. In some implementations, each of the perception system 110, the prediction system 112, the motion planning system 114, the vehicle controller 116, and the route determiner 122 can be implemented in hardware, firmware, and/or software controlling a general purpose processor. For example, in some implementations, each of the perception system 110, the prediction system 112, the motion planning system 114, the vehicle controller 116 and the route determiner 122 includes program files stored on a storage device, loaded into a memory and executed by one or more processors. In other implementations, each of the perception system 110, the prediction system 112, the motion planning system 114, the vehicle controller 116, and the route determiner 122 includes one or more sets of computer-executable instructions that are stored in a tangible computer-readable storage medium such as RAM hard disk or optical or magnetic media, as is further described in FIG. 2.

Figure 2:
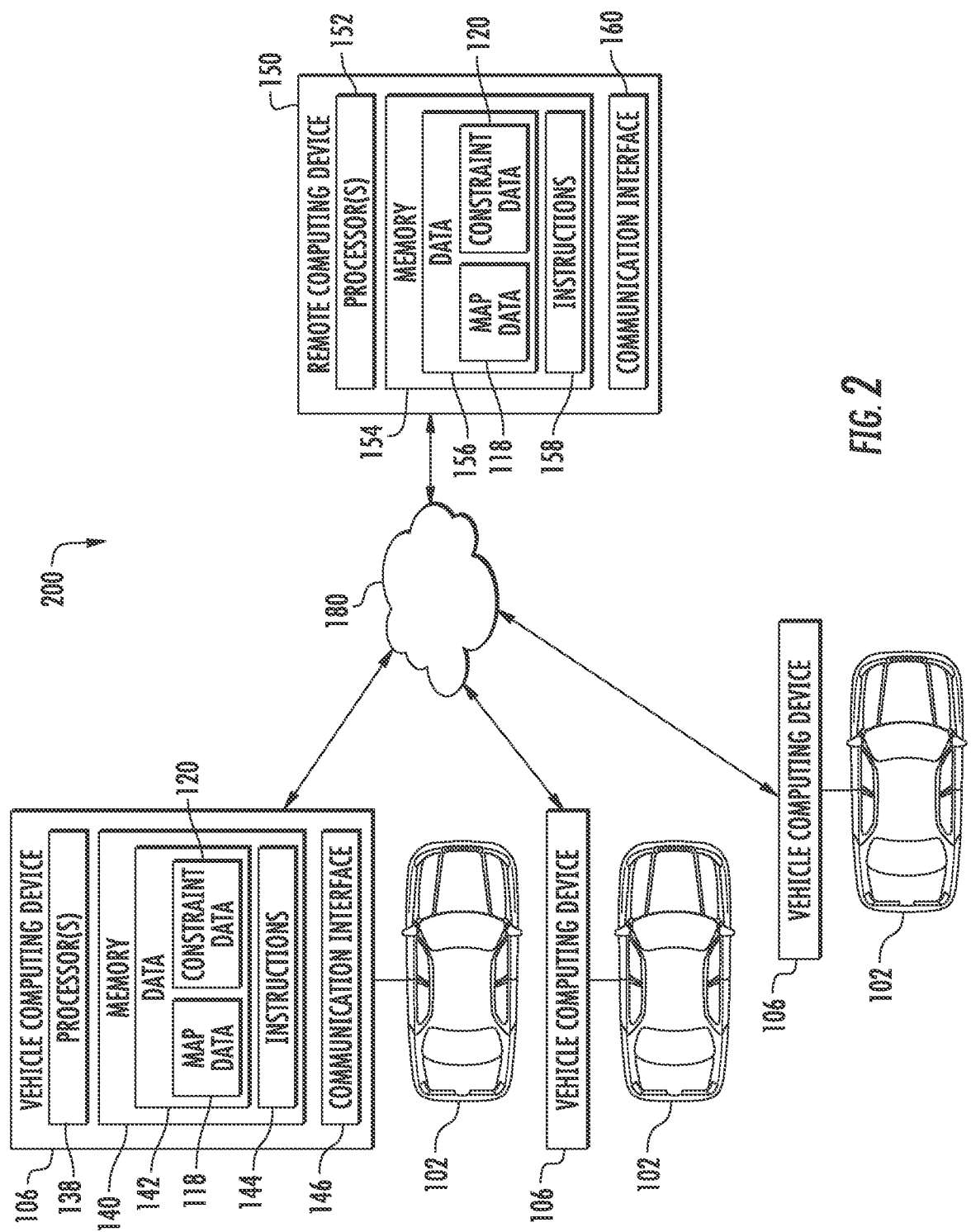
FIG. 2 depicts an example system for communicating map data and constraint data according to example embodiments of the present disclosure.

FIG. 2 depicts a block diagram of an example computing system 200 according to example embodiments of the present disclosure. In particular, FIG. 2 illustrates an example implementation of the present disclosure in which one or more remote computing devices 150 are communicatively coupled with one or more vehicle computing devices 106 over a network 180. Each vehicle computing device 106 can be part of a vehicle computing system 100 associated with a particular autonomous vehicle 102. It should be appreciated that FIG. 2 illustrates only one example computing system 200 that can be used to implement the present disclosure. Other computing systems can be used as well.

Each vehicle computing device 106 can include one or more processors 138 and a memory 140. The one or more processors 138 can be any suitable processing device (e.g., a processor core, a microprocessor, an ASIC, a FPGA, a controller, a microcontroller, etc.) and can be one processor or a plurality of processors that are operatively connected. The memory 140 can include one or more non-transitory computer-readable storage mediums, such as RAM, ROM, EEPROM, EPROM, flash memory devices, magnetic disks, etc., and combinations thereof. The memory 140 can store data 142 and instructions 144 which are executed by the processor 138 to cause the vehicle computing device 106 to perform operations. Data 142 can include map data 118 and constraint data 120.

The vehicle computing device(s) 106 can obtain map data 118 and/or constraint data 120 via interaction with the remote computing device(s) 150 that are communicatively coupled over the network 180. The remote computing device(s) 150 can be separate from the vehicle computing device(s) 106 and provided in a location remote from the vehicle computing device(s) 106, for instance, in a central control system associated with a service provider, owner, and/or fleet operator controlling a fleet of autonomous vehicles 102.

The remote computing device(s) 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the remote computing device(s) 150 to perform operations. The data 156 can include map data 118 and constraint data 120 that is relayed over network 180 to one or more vehicle computing devices 106 associated with respective autonomous vehicles 102.

Referring still to FIG. 2, the network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). In some examples, vehicle computing device(s) 106 and/or remote computing device(s) 150 can further include one or more communication interfaces 146, 160, including any suitable components (transmitters, receivers, ports, controllers, antennas, etc.) for interfacing with network 180 or one or more other networks.

Figure 3:
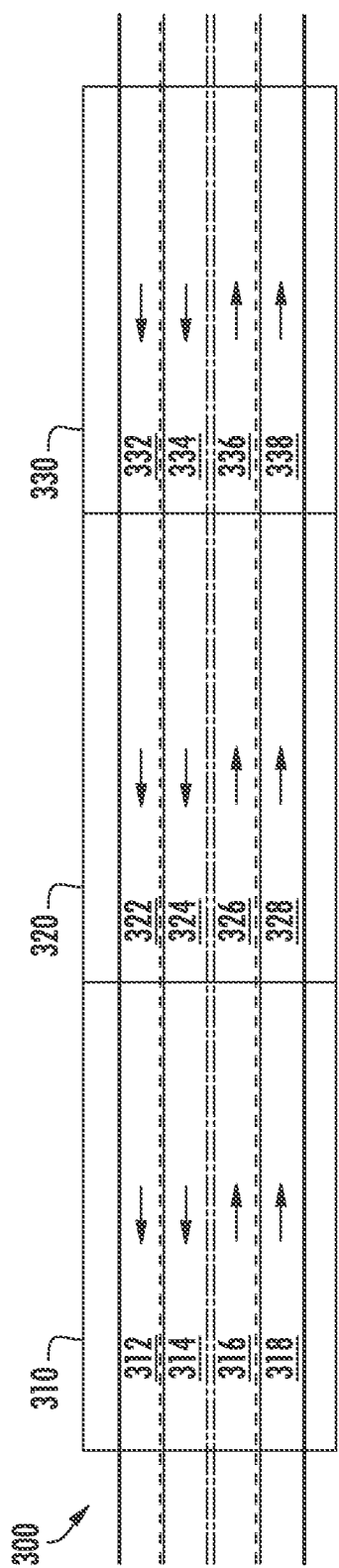
FIG. 3 depicts a first example aspect of map data including travel way portions according to example embodiments of the present disclosure.
Figure 4:
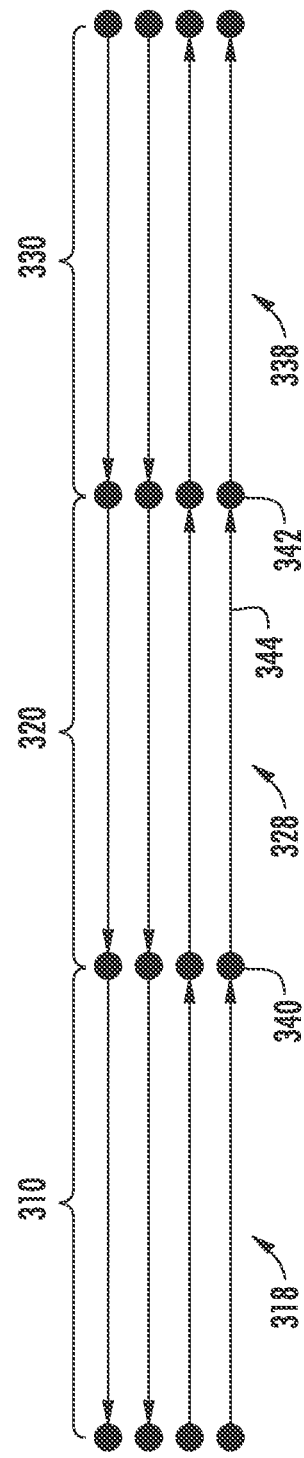
FIG. 4 depicts second example aspect of map data including travel way portions according to example embodiments of the present disclosure.

FIGS. 3-4 depict first and second example aspects of map data 118, particularly map data relative to the illustrated travel way portions, according to example embodiments of the present disclosure. As previously described, map data 118 can include a wealth of information regarding the identity and location of different travel ways (e.g., roads, road segments, lanes, lane segments, parking lanes, turning lanes, bicycle lanes, or other portions of a particular travel way), buildings, maintenance/service locations for the autonomous vehicles, parking areas, traffic signs, traffic lights, traffic control devices, and/or any other map data that provides information that assists the computing system in comprehending and perceiving its surrounding environment and its relationship thereto. The particular identifiers discussed in FIGS. 3-4 for representing map data 118 can also be used to represent constraint data 120 and/or travel routes determined by route determiner 122.

Referring now to FIG. 3, information about each travel way within map data 118 can be provided in detailed form. For instance, a portion of road 300 can be represented within map data 118 as a plurality of road segments 310, 320, and 330. Each road segment can respectively include one or more lanes. In the example of FIG. 3, road segment 310 includes two lane segments 312 and 314 associated with travel in a first direction and two lane segments 316 and 318 associated with travel in a second direction (e.g., opposing the first direction). Road segment 320 includes two lane segments 322 and 324 associated with travel in a first direction and two lane segments 326 and 328 associated with travel in a second direction (e.g., opposing the first direction). Road segment 330 includes two lane segments 332 and 334 associated with travel in a first direction and two lane segments 336 and 338 associated with travel in a second direction (e.g., opposing the first direction).

Referring now to FIG. 4, each travel way within map data 118 can be defined using additional and/or alternative data than depicted in FIG. 3. For instance, each travel way portion (e.g., lane segments 312-318, 322-328, 332-328) can include a lane segment identifier, a road segment identifier, a road identifier, a district identifier, a start point, an end point, a directionality vector indicating a direction of traffic flow between start and end points, and/or connectivity identifiers for other travel way portions that are predecessors and/or successors thereto. For example, lane segment 328 can be defined using lane segment identifier 328, road segment identifier 320, road identifier 300, start point 340, end point 342, a directionality vector 344 indicating the direction of traffic flow between start point 340 and end point 342, and an indication that lane segment 328 is connected to predecessor lane segment 318 (of road segment 310) and successor lane segment 338 (of road segment 330).

In some implementations, map data 118, constraint data 120 and/or travel routes determined by route determiner 122 can be identified in terms of particular districts or coverage areas that include some or all of such data. For instance, travel way portion identifiers such as described, for example, in FIGS. 3-4 can be additionally identified in terms of what district or coverage area they are included in. By breaking a map down into different districts or coverage areas, the disclosed systems and methods can more easily identify which portions of map data 118 need to be evaluated relative to constraint data 120 to determine appropriate travel routes.

Figure 5:
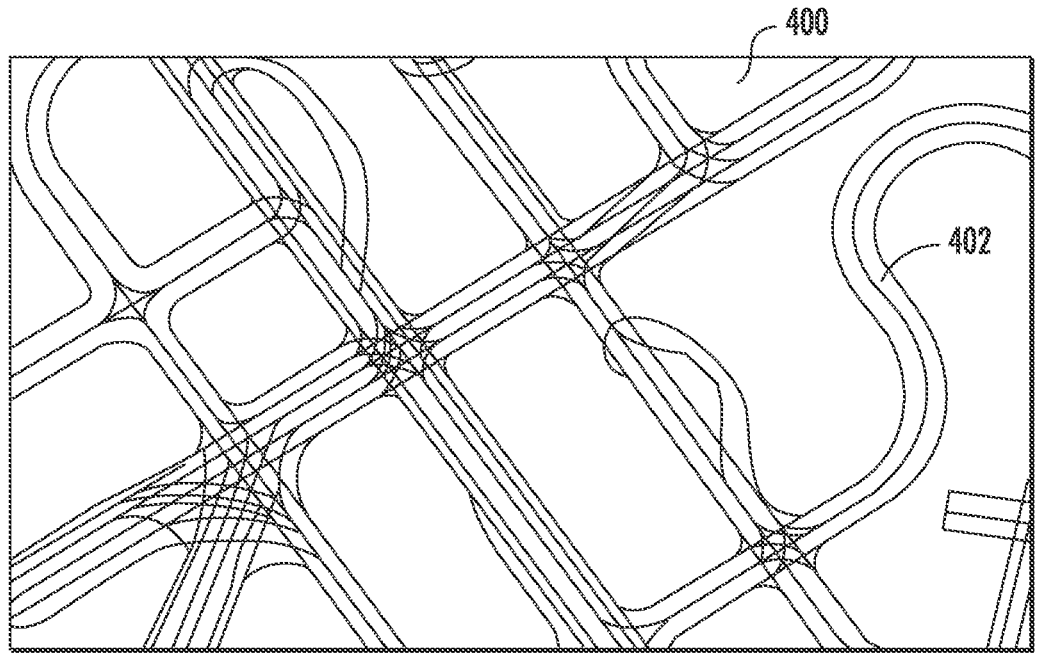
FIG. 5 depicts a third example aspect of map data including an example geographic location according to example embodiments of the present disclosure.
Figure 6:
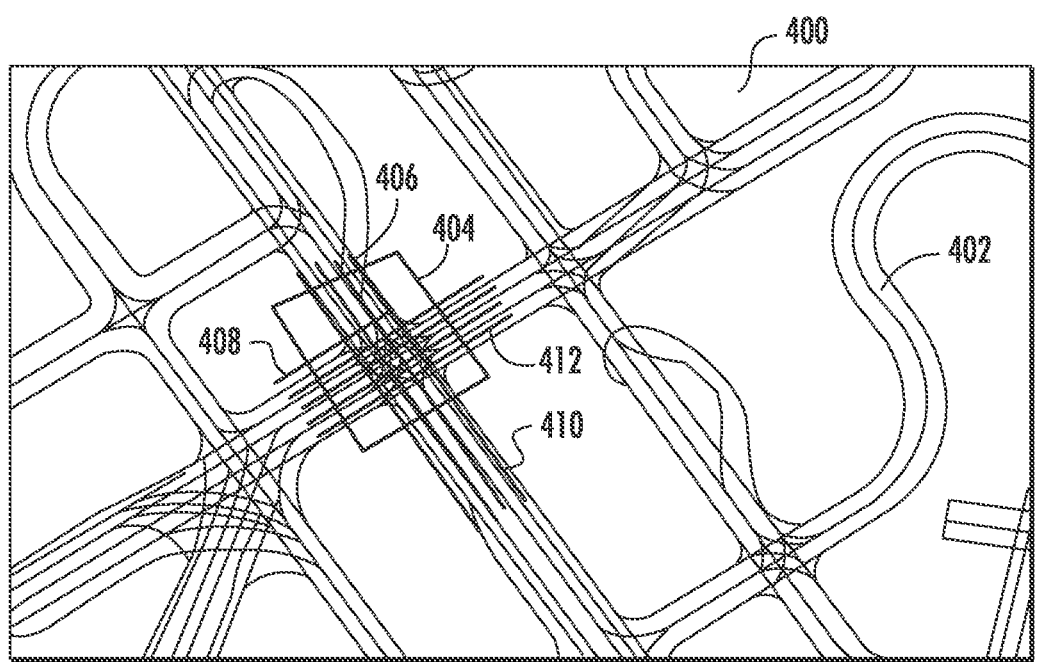
FIG. 6 depicts a fourth example aspect of map data including example constraint data generated within the example geographic location of FIG. 5 according to example embodiments of the present disclosure.

FIGS. 5-6 depict additional aspects of map data including example constraint data generated within an example geographic location according to example embodiments of the present disclosure. More particularly, FIG. 5 graphically depicts a portion of map data 400 that includes a plurality of travel way portions 402 along which an autonomous vehicle can be controlled to navigate within the particular geographic location represented by map data 400. Travel way portions 402 can include a combination of different travel way portions (e.g., lane segments, road segments, etc.) that are included within the displayed portion of map data 400.

FIG. 6 depicts the same map data 400 provided in FIG. 5 along with additional constraint data in the form of a polygon 404. In this particular example, polygon 404 has a first application type corresponding to an "exclusion" type and a second application type corresponding to a "partial" type. In other words, polygon 404 is a partial exclusion polygon 404, and has a predetermined boundary that encompasses a geographic area within a portion of the map data 400. Although exclusion polygon 404 is shown to include four vertices and four edges, the boundary of an exclusion polygon or other polygon can include any number of vertices and edges in a variety of configurations, and can sometimes be shaped relative to the locations of nearby travel way portions.

When the map data 400 of FIG. 6 is evaluated relative to the constraint data (e.g., partial exclusion polygon 404), permitted and/or forbidden travel way portions can be determined. In this particular example, assuming that polygon 404 was received in a constraint file having a default "permit" state, all travel way portions should be permitted except for those travel way portions that are either completely enclosed or partially touched by exclusion polygon 404. Because travel way portions 406, 408, 410 and 412 in FIG. 6 are either completely enclosed or partially touched by exclusion polygon 404, travel way portions 406-412 are determined to be forbidden travel way portions. When an autonomous vehicle initially determines a travel route or updates a previously determined travel route based on the constraint data of FIG. 6, travel routes that include travel way portions 406-412 will be forbidden.

Figure 7:
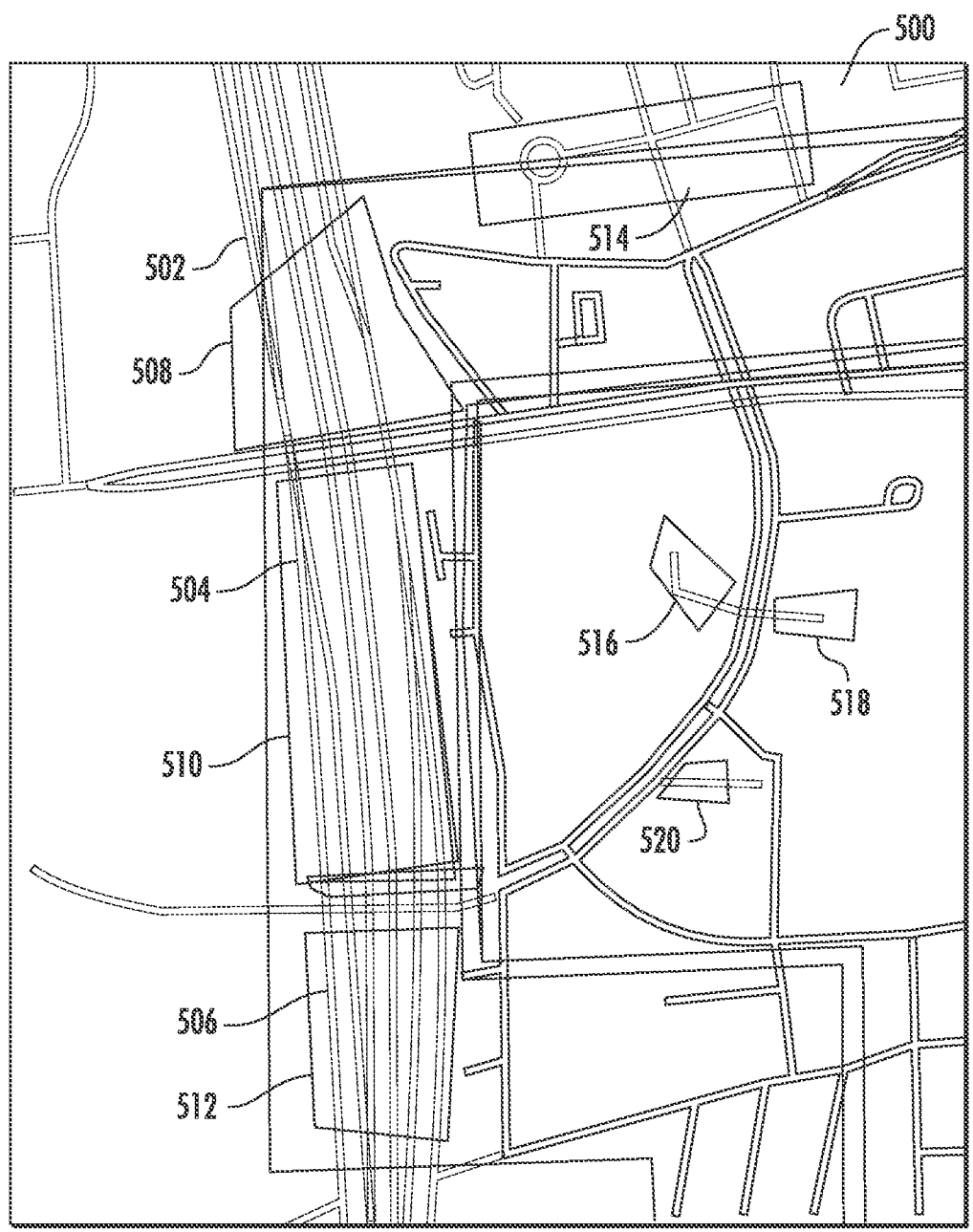
FIG. 7 depicts a fifth example aspect of map data including example constraint data according to example embodiments of the present disclosure.

FIG. 7 depicts another example of map data and constraint data, particularly illustrating example exclusion polygons that may be created using the disclosed systems and methods to prevent an autonomous vehicle from using travel way portions that lead to or through a bridge within a particular geographic area. An example of this nature could arise, for instance, during planned construction that causes a bridge to be closed for an extended period of time or during an accident that temporarily affects navigation over such a bridge. FIG. 7 depicts map data 500 that includes travel way portions 502, 504, and 506 along a bridge. Exclusion polygons 508, 510, and 512 can be created to exclude respective travel way portions 502, 504, and 506 from permissible travel way portions for the determined travel routes of one or more autonomous vehicles. Additional exclusion polygons 514, 516, 518 and 520 can be created to exclude additional travel way portions, for example, travel way portions that directly or indirectly lead to the travel way portions 502-506 along the bridge.

In some examples, the map data 400, 500 of FIGS. 5-7 and associated constraint data can be generated using a software application and corresponding graphical user interfaces provided on a remote computing device such as remote computing device(s) 150 of FIG. 2. For example, specific portions of map data (e.g., map data 400, 500) can be identified by providing a specific address, landmark, latitude and longitude or other geographic identifier in a search interface feature within a graphical user interface. Map data then can be retrieved from a maps database corresponding to a geographic area surrounding the geographic identifier. In some examples, map data can be retrieved that corresponds with the same map data locally available at particular autonomous vehicles or fleets of autonomous vehicles.

Polygons (e.g., exclusion polygons 404, 508-520) or other constraint data can be drawn within a graphical user interface containing map data (e.g., map data 400, 500) using a drawing tool feature. For instance, a user can provide input to select the location of the vertices of each polygon using, for example, mouse clicks, keyboard entry or other input device selection. Polygon edges between the identified vertices can then be formed automatically by the drawing tool feature. The polygons or other constraint data can be defined in terms of global map coordinates that translate to similar global map coordinates provided within map data corresponding to a same geographic location or area. In some implementations, one or more polygons or other constraint data can be saved as one or more separate constraint files for selectively uploading and applying to one or more autonomous vehicles, fleets of vehicles, and/or geographic districts.

FIGS. 5-7 make use of geographic identifiers in the form of polygons having application types in the form of an exclusion type. It should be appreciated that constraint data can be provided in a variety of additional or alternative suitable formats. For example, geographic identifiers can include, for example, one or more polygons encompassing a geographic area, one or more travel way identifiers indicative of at least a portion of one or more lanes within a particular travel way, or other identifiers. In some implementations, the application type associated each geographic identifier can be selected from a predetermined group of application types (e.g., complete inclusion, partial inclusion, complete exclusion, partial exclusion, etc.). In another example, the application type can be selected as a value from within a range of possible application type values (e.g., a number selected from within a range of 0-10 with 0 being least permissible and 10 being most permissible). In another example, an application type can correspond to an associated cost factor for navigating in a particular geographic area.

FIGS. 8-9 depict example user interfaces 540 and 580 for applying constraint data according to example embodiments of the present disclosure. In some examples, user interfaces 540, 580 or others can be provided as part of a software application provided on a remote computing device such as remote computing device(s) 150 of FIG. 2. In some examples, the software application providing graphical user interfaces 540 and 580 can also provide graphical user interfaces for displaying and creating the map data and constraint data depicted in FIGS. 5-7.

Referring now to FIG. 8, graphical user interface 540 can afford a computing device user the ability to perform a variety of functions. For instance, graphical user interface 540 can include an interface portion 541 that can be used to view all constraint data (e.g., identified by specific constraint files) created by a software application, independent of which constraint data is applied to a particular vehicle or fleet of vehicles. Interface portion 542 can include one or more districts that correspond to the area including each particular constraint file identified in interface portion 541, while interface portion 543 can include an optional additional description describing what each constraint file identified in interface portion 541 represents. For each constraint file identified in interface portion 541, an additional interface portion 544 can identify one or more vehicles to which each constraint file is attached, as well as when the constraint file was added, who added the constraint file to the software application, and whether the constraint file is currently applied. One or more selectable interface elements 545 can be provided to delete existing constraint files. One or more selectable interface elements 546 and/or 547 can be provided to upload new constraint files. One or more selectable interface elements 548 can be provided to apply selected constraint files to particular vehicles(s), fleet(s) and/or district(s).

In some implementations, user selection of an interface element such as interface elements 545-548 can initiate the display of additional or alternative graphical user interfaces. For example, selecting a particular constraint file followed by selection of interface element 548 in graphical user interface 540 of FIG. 8 can initiate the display of an additional graphical user interface 580 as depicted in FIG. 9. Graphical user interface 580 can include one or more selectable interface elements for identifying particular application targets for a given constraint file. For instance, user selection of interface element 582 can be used to apply selected constraint files to one or more particular vehicles as identified in drop down menu 588. User selection of interface element 584 can be used to apply selected constraint files to one or more particular fleets of vehicles, also as identified using drop down menu 588. User selection of interface element 586 can be used to apply selected constraint files to one or more particular districts using, for example, drop down menu 588. Once a constraint file is selected for application using graphical user interfaces 540 and/or 580, such constraint files can be transmitted to one or more autonomous vehicles 102 over a network (e.g., network 180 of FIG. 2). Once received by an autonomous vehicle, the constraint files can be manually or automatically accepted by the autonomous vehicle and used to determine new and/or updated travel routes.

Figure 10:
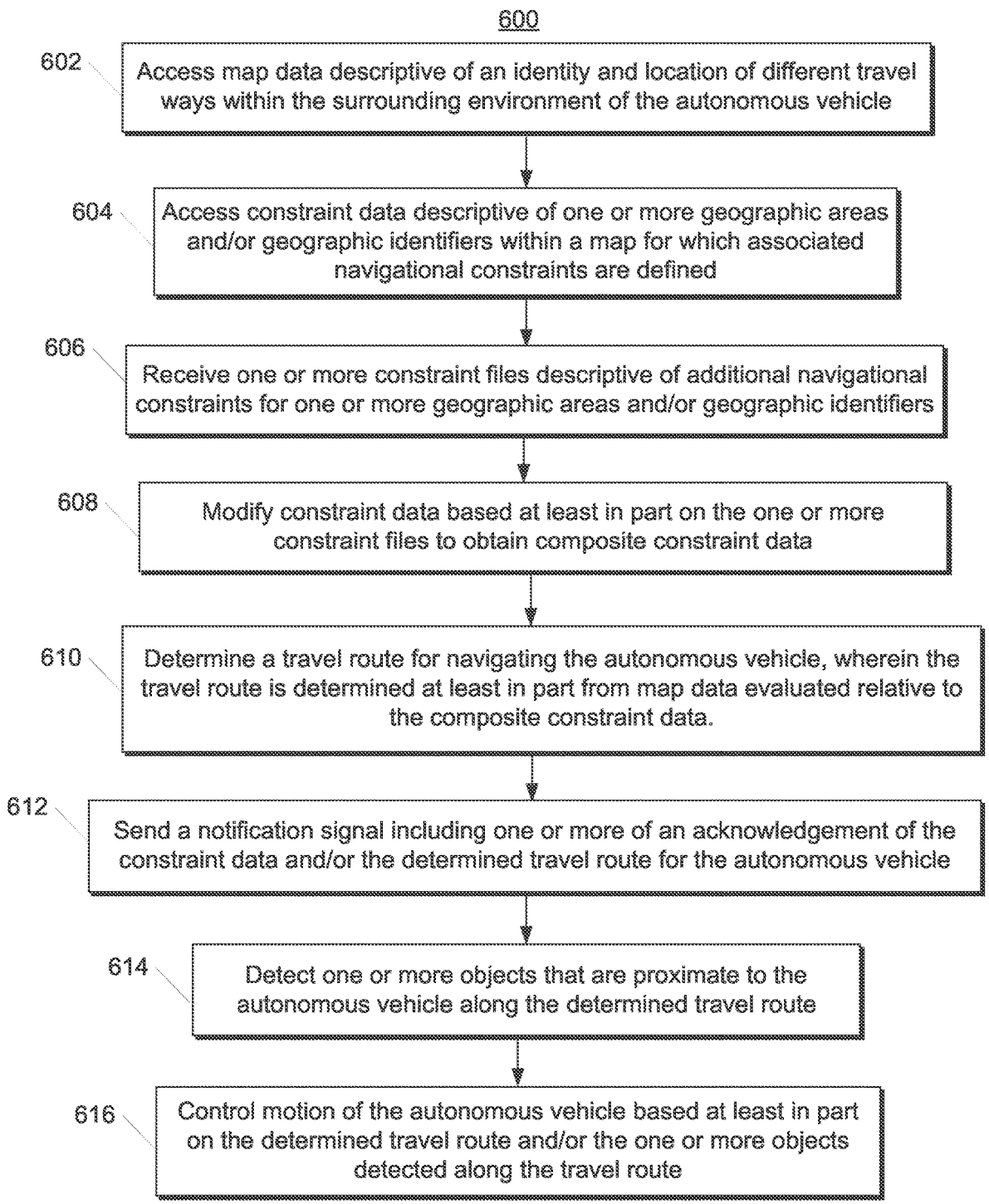
FIG. 10 depicts an example flow chart of a first example method of controlling navigation of an autonomous vehicle according to example embodiments of the present disclosure.

FIG. 10 depicts an example flow chart of a first example method 600 of controlling navigation of an autonomous vehicle 102 according to example embodiments of the present disclosure. One or more portion(s) of the method 600 can be implemented by one or more computing devices such as, for example, the computing device(s) 106 of FIG. 1. Moreover, one or more portion(s) of the method 600 can be implemented as an algorithm on the hardware components of the device(s) described herein (e.g., as in FIGS. 1 and 2) to, for example, control the motion of an autonomous vehicle 102. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600 can include accessing, retrieving, or otherwise obtaining map data descriptive of an identity and location of different travel ways within the surrounding environment of the autonomous vehicle. The map data accessed at (602) can include at least a portion of map data 118 described in FIGS. 1-2. The map data accessed at (602) can provide information regarding the identity and location of different travel ways (e.g., roads, road segments, lanes, lane segments, parking lanes, turning lanes, bicycle lanes, or other portions of a particular travel way). In some examples, travel way portions within map data accessed at (602) can include one or more descriptors including, for example, a district identifier for a map coverage area containing the travel way portion, a travel way portion identifier, a start point for the travel way portion, an end point for the travel way portion, a directionality (e.g., direction of traffic flow), and/or connectivity identifiers for other travel way portions that are predecessors and/or successors to a given travel way portion. Map data accessed at (602) can also include the identity and location of different items than travel ways, including but not limited to buildings, maintenance/service locations for the autonomous vehicles, parking areas, traffic signs, traffic lights, traffic control devices, and/or any other map data that provides information that assists the computing system in comprehending and perceiving its surrounding environment and its relationship thereto.

At (604), method 600 can include accessing, retrieving, or otherwise obtaining constraint data descriptive of one or more geographic areas and/or geographic identifiers within a map (e.g., map data accessed at (602)) for which associated navigational constraints are defined. The constraint data accessed at (604) can include at least a portion of constraint data 120 described in FIGS. 1-2. Constraint data accessed at (604) can include different forms of information describing navigational constraints. For example, constraint data can include a priori map constraints identifying particular travel way portions from which an autonomous vehicle 102 should be excluded or have a reduced likelihood of operation. For instance, constraint data accessed at (604) can prevent or reduce the likelihood of an autonomous vehicle 102 making a left hand turn in particular turn lanes of a given travel way or travel way portion when a vehicle is operating in a particular mode (e.g., fully autonomous mode).

In some implementations, constraint data accessed at (604) can include one or more portions of base constraint data applied to a particular autonomous vehicle. In some implementations, the portions of base constraint data selected for application to a particular vehicle can depend at least in part on factors such as the operation location, operating mode, or other factors associated with each autonomous vehicle. Different operating modes can include, for example, a fully autonomous mode in which an autonomous vehicle 102 operates without a human driver present in the vehicle, an autonomous mode in which the autonomous vehicle operates with a human driver in the vehicle, or other modes. Different operating modes can additionally or alternatively include, for example, whether a vehicle is currently engaged (e.g., on-task) or not engaged (e.g., off-task) in performing a service. For instance, some vehicles may currently have passengers on board that are being driven from one location to another, while other vehicles may be engaged in controlled navigation but not currently engaged in a particular operational task.

At (606), the method 600 can include receiving one or more constraint files descriptive of additional navigational constraints for one or more geographic areas and/or geographic identifiers. In some implementations, the one or more constraint files received at (606) can be received from one or more remote computing devices that are remote from the autonomous vehicle and that are configured to control operation of a fleet of autonomous vehicles. The one or more constraint files can be generated by the one or more remote computing devices, for example, in response to identification of an event at some geographic location that will impact navigation at such location (e.g., a street fair, sporting event, traffic accident, etc.) at a present and/or future time.

Each constraint file received at (606) can include a constraint set including zero or more geographic identifiers (e.g., polygons having boundaries defined relative to a geographic area and having an associated application type) as well as a default state (e.g., permit, forbid) indicating whether to by default permit or forbid areas described by the constraint file. Each geographic identifier described by the constraint file(s) received at (606) can be provided in a variety of suitable formats. Geographic identifiers can include, for example, one or more polygons encompassing a geographic area, one or more travel way identifiers indicative of at least a portion of one or more lanes within a particular travel way, or other identifiers. Application types associated with each geographic identifier provided within the constraint file(s) received at (606) can also be provided in a variety of suitable formats. For example, the application type associated with each geographic identifier can be selected from a predetermined group of first application types (e.g., inclusion, exclusion, etc.). In another example, the application type associated with each geographic identifier can be selected from a predetermined group of second application types (e.g., partial, complete, etc.) In another example, the application type can be selected as a value from within a range of possible application type values (e.g., a number selected from within a range of 0-10 with 0 being least permissible or preferred and 10 being most permissible or preferred). In another example, an application type can correspond to an associated cost factor for navigating in a particular geographic area.

At (608), method 600 can include generating composite constraint data. Generating composite constraint data can include modifying the constraint data accessed at (604) based at least in part on the one or more constraint files received at (606). Constraint data included within the one or more constraint files received at (606) can either append or revise existing constraint data. In some examples, existing constraint data includes base constraint data determined for a particular vehicle. In some examples, existing constraint data includes base constraint data as well as constraint data received in one or more previously received constraint files. In such instances, constraint files received at (606) can sometimes completely overwrite previously received constraint files such that modifying constraint data at (608) includes removing previously received constraint files and adding newly received constraint files. In some examples, constraint files received at (606) are added to and/or combined with previously received constraint files when modifying constraint data at (608).

In some implementations, the constraint data accessed at (604) can include one or more inviolate constraints. Inviolate constraints can include those constraints that should not be changed or overwritten due to a level of importance in their application during autonomous navigation. In such instances, modifying constraint data at (608) can include adding to or revising the constraint data accessed at (604) in a manner that does not conflict with inviolate constraints within the constraint data. The modification of constraint data at (608) can be implemented such that composite constraint data always includes any inviolate constraints. In other words, modification of constraint data at (608) should not remove any constraints from the constraint data accessed at (604) that are identified as inviolate constraints.

At (610), the method 600 can include determining a travel route for navigating the autonomous vehicle 102. The travel route determined at (610) can be determined at least in part from map data accessed at (602) evaluated relative to the composite constraint data generated at (608). For example, the map data accessed at (602) can be evaluated in association with the composite constraint data generated at (608) to determine which travel way portions are permitted and/or which travel way portions are forbidden from possible navigable travel ways within a set of map data. In some examples, a travel route can be determined at (610) that does not include a forbidden travel way portion.

In some examples, a travel route can be determined (610) that gives preference to travel way portions having an application type associated with a lower cost factor. When constraint data includes application types associated with cost factors, one or more computing devices associated with an autonomous vehicle 102 can determine a travel route at (610) that minimizes a total cost based at least in part on cost factors associated with application types included as part of constraint data 120 as well as optional additional cost factors, cost functions or the like for other navigational objectives. Depending on the manner of application type, travel routes can be determined at (610) that not only can exclude particular areas from navigation but that additionally or alternatively can reduce traffic in particular areas based at least in part on evaluation of the constraint data.

A travel route determined at (610) can include, for example, a sequence of multiple travel way portions along which an autonomous vehicle can navigate, for example, to accomplish a predetermined navigational objective. Each travel way portion within a determined travel route can be defined by one or more of a travel way identifier, a start point, an end point, directionality, and/or connectivity identifiers for predecessor and/or successor travel way portions.

In some examples, travel routes determined at (610) can be determined in accordance with a navigational objective (e.g., traveling to a destination location to perform a service such as rideshare service, delivery service, courier service, etc.). In some examples, travel routes determined at (610) can be determined to accomplish the navigational objective using travel way portions that are permitted and/or preferred as opposed to forbidden and/or not preferred based on map data evaluated in association with constraint data. In some implementations, for example, it may be desirable to forbid or not prefer specific areas or specific travel ways within an area due to events such as a traffic accident, street fair, construction, or the like. In other implementations, for example, it may be desirable to permit or prefer specific areas or specific travel ways within an area for navigation by particular autonomous vehicles that are assigned to perform services in a given area, thus affording efficient distribution of fleet resources.

At (612), the method 600 can include sending a notification signal. In some examples notification signals sent at (612) can be sent from a vehicle computing device 106 as depicted in FIGS. 1 and 2. In some examples, notification signals sent at (612) can be sent to one or more remote computing devices 150 as depicted in FIG. 2. In some examples, notification signals sent at (612) can be sent over a network 180 as depicted in FIG. 2. In some implementations, a notification signal sent at (612) can include one or more of an acknowledgement of receipt of the one or more constraint files received at (606) and/or a confirmation of modification of constraint data at (608). In some implementations, a notification signal sent at (612) can additionally or alternatively include the travel route determined at (610).

At (614), the method 600 can include detecting one or more objects that are proximate to the autonomous vehicle 102 as it navigates along the travel route determined at (610). Detection of objects at (614) can be implemented by analyzing sensor data obtained from one or more sensors (e.g., image capture devices, RADAR devices, LIDAR devices, etc.) 104 depicted in FIG. 1. The perception system 110 of FIG. 1 can detect object(s) including, for example, pedestrians, other vehicles, bicycles, barriers, boundaries, traffic control devices, etc. The sensor data can be indicative of locations associated with the object(s) within the surrounding environment of the autonomous vehicle at one or more time(s). Perception system 110 can further analyze the sensor data to detect certain objects as objects of interest from background or other objects.

At (616), the method 600 can include controlling motion of the autonomous vehicle based at least in part on the travel route determined at (610) and/or the one or more objects detected along the travel route at (614). Motion of an autonomous vehicle 102 can be controlled at (616) by determining a motion plan relative to the travel route. The motion plan can be configured to generally follow the travel route while concurrently planning to navigate appropriately relative to any detected objects proximate to the autonomous vehicle (e.g., pedestrians, other vehicles, traffic control devices, etc.) that are detected by the vehicle's sensors.

In some implementations, controlling motion of a vehicle at (616) can be done in accordance with an optimization algorithm that considers cost factors associated with the constraint data (e.g., application types having associated cost factors) as well as other cost factors or functions (e.g., based on speed limits, traffic lights, etc.), if any, to determine optimized variables that make up a motion plan. By way of example, motion of a vehicle can be controlled in a manner that accomplishes a navigational objective using permitted travel way portions from a travel route determined at (610) without increasing the potential risk to the vehicle 102 and/or violating any traffic laws (e.g., speed limits, lane boundaries, signage).

Controlling motion of a vehicle at (616) can include providing data indicative of a motion plan to a vehicle controller to implement the motion plan for the autonomous vehicle 102. For instance, an autonomous vehicle 102 can include a vehicle controller 116 as depicted in FIG. 1 that is configured to translate the motion plan into instructions. By way of example, the vehicle controller 116 can translate a determined motion plan into instructions to adjust the steering of the autonomous vehicle 102 "X" degrees, apply 10% braking force, modulate a speed of the autonomous vehicle 102, etc. The vehicle controller 116 can send one or more control signals to components of the vehicle controls 108 (e.g., braking control component, steering control component, speed/throttle control component) to execute the instructions and implement the motion plan.

Figure 11:
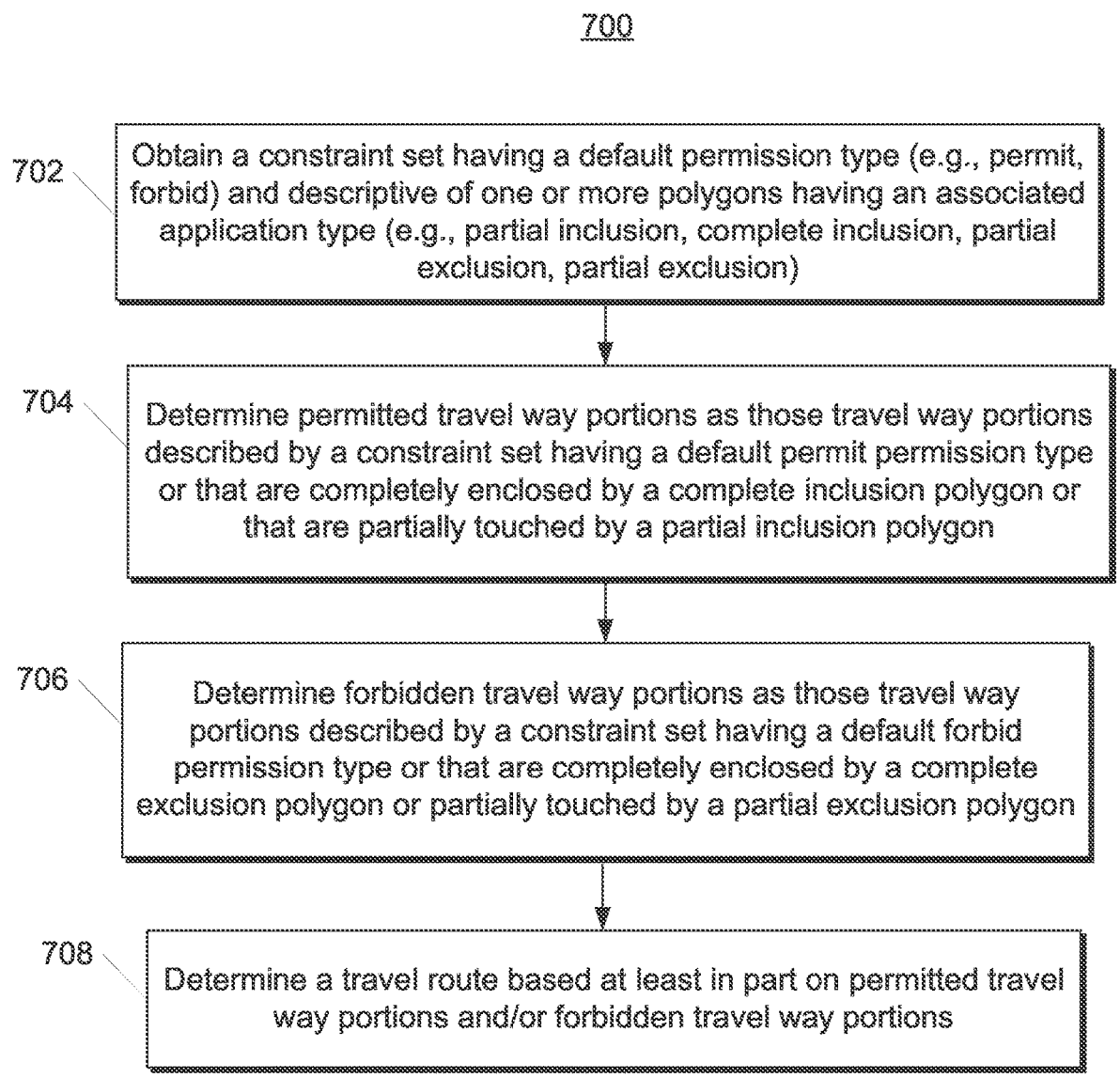
FIG. 11 depicts an example flow chart of a method of determining a travel route for an autonomous vehicle according to example embodiments of the present disclosure.

FIG. 11 depicts a flow chart of an example method 700 of a determining a travel route for an autonomous vehicle, such as referred to in (610) of FIG. 10. One or more portion(s) of the method 700 can be implemented by one or more computing devices such as, for example, the computing device(s) 106 of FIG. 1. Moreover, one or more portion(s) of the method 700 can be implemented as an algorithm on the hardware components of the device(s) described herein (e.g., as in FIGS. 1 and 2) to, for example, control the motion of a vehicle. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include obtaining a constraint set having a default state (e.g., permit or forbid) and being descriptive of zero or more geographic identifiers (e.g., polygons) and associated application types (e.g., complete inclusion, complete exclusion, partial inclusion, partial exclusion). In a specific implementation, method 700 can include obtaining at (702) constraint data descriptive of one or more polygons having an associated application type. Each polygon can correspond, for example, to an inclusion polygon identifying an area for inclusion in a permissible area for navigation by an autonomous vehicle 102 and/or an exclusion polygon identifying an area for exclusion from a permissible area for navigation by an autonomous vehicle 102.

At (704), the method 700 can include determining permitted travel way portions. For instance, permitted travel way portions can be determined as those travel way portions that are described by a constraint set having a default "permit" state, that are completely enclosed by a complete inclusion polygon, or that are completely enclosed or partially touched by a partial inclusion polygon. At (706), the method 700 can include determining forbidden travel way portions. For instance, forbidden travel way portions can be determined as those travel way portions that are described by a constraint set having a default "forbid" state, that are completely enclosed by a complete exclusion polygon, or that are completely enclosed or partially touched by a partial exclusion polygon. When a travel way portion is part of both an inclusion polygon and an exclusion polygon, such travel way portion should be excluded. In other words, determination as an excluded travel way portion can trump determination as an included travel way portion.

At (708), the method 700 can include determining a travel route based at least in part on permitted travel way portions determined at (704) and forbidden travel way portions determined at (706). Determining a travel route at (708) can be implemented, for example, by route determiner 122 of FIG. 1. Travel routes determined at (708) can preferably consist of permitted travel way portions determined at (704) without any of the forbidden travel way portions determined at (706).

Figure 12:
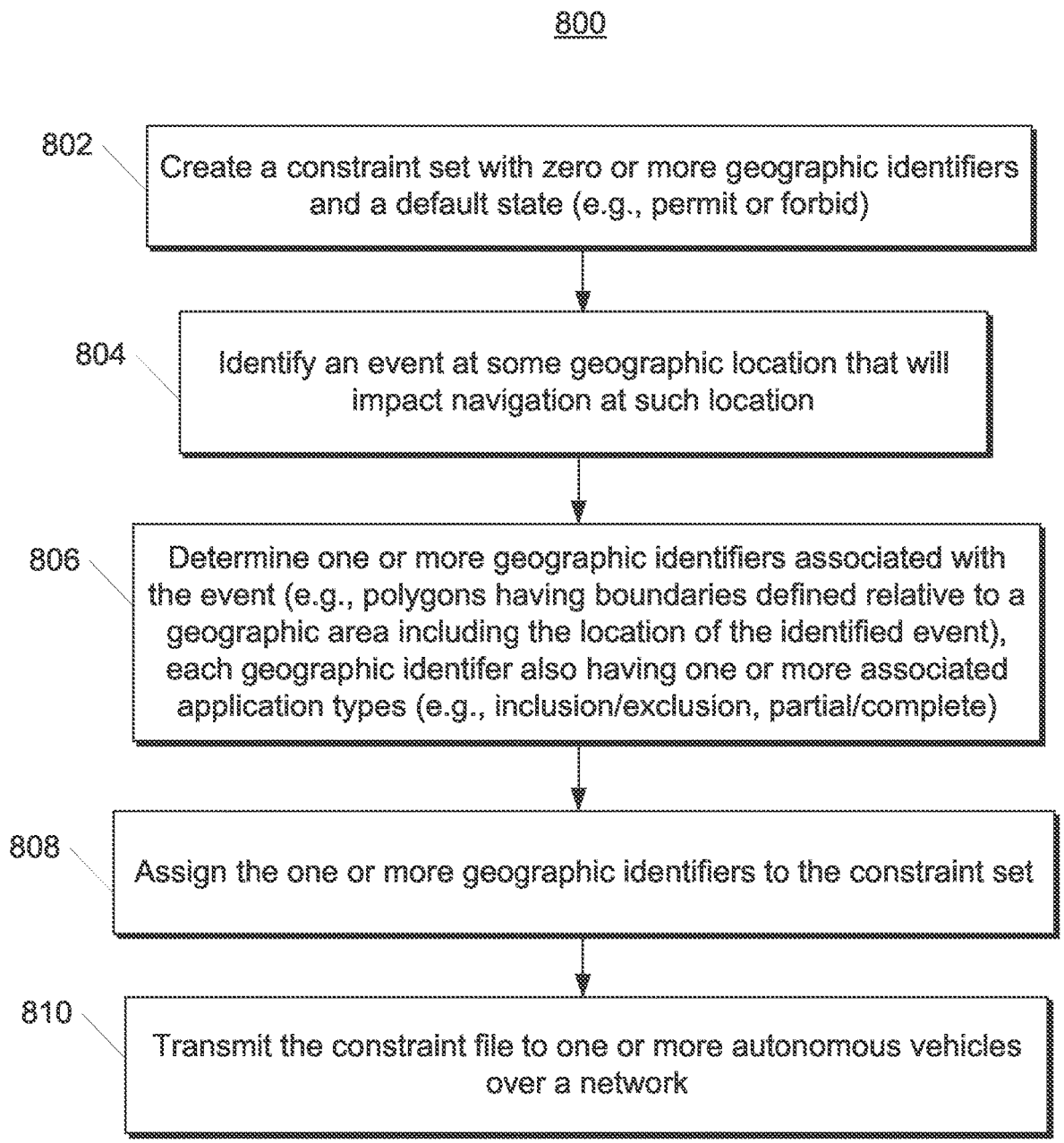
FIG. 12 depicts an example flow chart of a second example method of controlling navigation of an autonomous vehicle according to example embodiments of the present disclosure.

FIG. 12 depicts an example flow chart of a second example method (800) of controlling navigation of an autonomous vehicle according to example embodiments of the present disclosure. One or more portion(s) of the method 800 can be implemented by one or more computing devices such as, for example, the remote computing device(s) 150 of FIG. 2. In some examples, such remote computing device(s) can be included as part of a central control system that is in wireless communication with a plurality of autonomous vehicles, such as a fleet of autonomous vehicles providing one or more services (rideshare service, delivery service, courier service, etc.).

Moreover, one or more portion(s) of the method 800 can be implemented as an algorithm on the hardware components of the device(s) described herein (e.g., as in FIG. 2) to, for example, control the motion of a vehicle. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (802), the method 800 can include creating a constraint set with zero or more geographic identifiers and having a default state (e.g., permit or forbid). The default state can indicate whether to by default permit or forbid areas described by a constraint set and/or constraint file that includes the constraint set.

At (804), the method 800 can include identifying an event at some geographic location that will impact navigation at such location (e.g., a street fair, sporting event, traffic accident, etc.). Identification of one or more events at (804), for which the disclosed constraint data can be determined, can come from data descriptive of an upcoming event (e.g., sporting event or the like) and/or historical data (e.g., by approximating navigational limitations based on past events in a particular geographic region at a certain time and/or date). Identification of one or more events at (802) can be implemented using various databases to predict, approximate, and/or determine the events and/or geographic locations of anticipated navigational limitations. For example, for different geographic regions, event information (e.g., location, time, and/or date of the event, or the like) can be stored in an event database. Event information can be indicative of whether traffic can be higher or lower at a certain time period (e.g., a time period before the event begins versus a time period when the event is ongoing). In another example, event information can come from calendar databases that indicate important dates (e.g., holidays, first days of school for a city, voting day, or the like). Other examples of outside sources or other stored data (e.g., predicted future, current and/or historic events, conditions, or the like) include weather conditions, news information (e.g., fires, emergency situations, or the like), social information (e.g., via social networking websites), traffic conditions, flight information from airports and/or airlines, or the like, or other information that can assist in determining event information, traffic patterns or other data contributing to potential navigational constraints.

For each event identified at (804), constraint data associated with the identified event can then be determined. For example, at (806), the method 800 can include determining one or more geographic identifiers associated with the event. For example, determining a geographic identifier at (806) can include determining a polygon having a boundary defined relative to a geographic area including the location of the event. In some implementations, the polygon can have a boundary that encompasses a geographic area including the location of the identified event. Each geographic identifier determined at (806) can also have an associated application type (e.g., inclusion, exclusion, complete, partial) for the geographic identifier (e.g., the polygon). In some examples, determining one or more geographic identifiers at (806) can be implemented using a drawing tool feature such as described with reference to FIGS. 5-6. At (808), the method 800 can include assigning the one or more geographic identifiers to the constraint set created at (802). A constraint file including the constraint set then can be transmitted at (810) to one or more autonomous vehicles 102 over a network (e.g., network 180 of FIG. 2). In some examples, transmitting constraint data at (810) can be initiated using one or more graphical user interfaces, such as graphical user interfaces 540, 580 of FIGS. 8-9.

Figure 13:
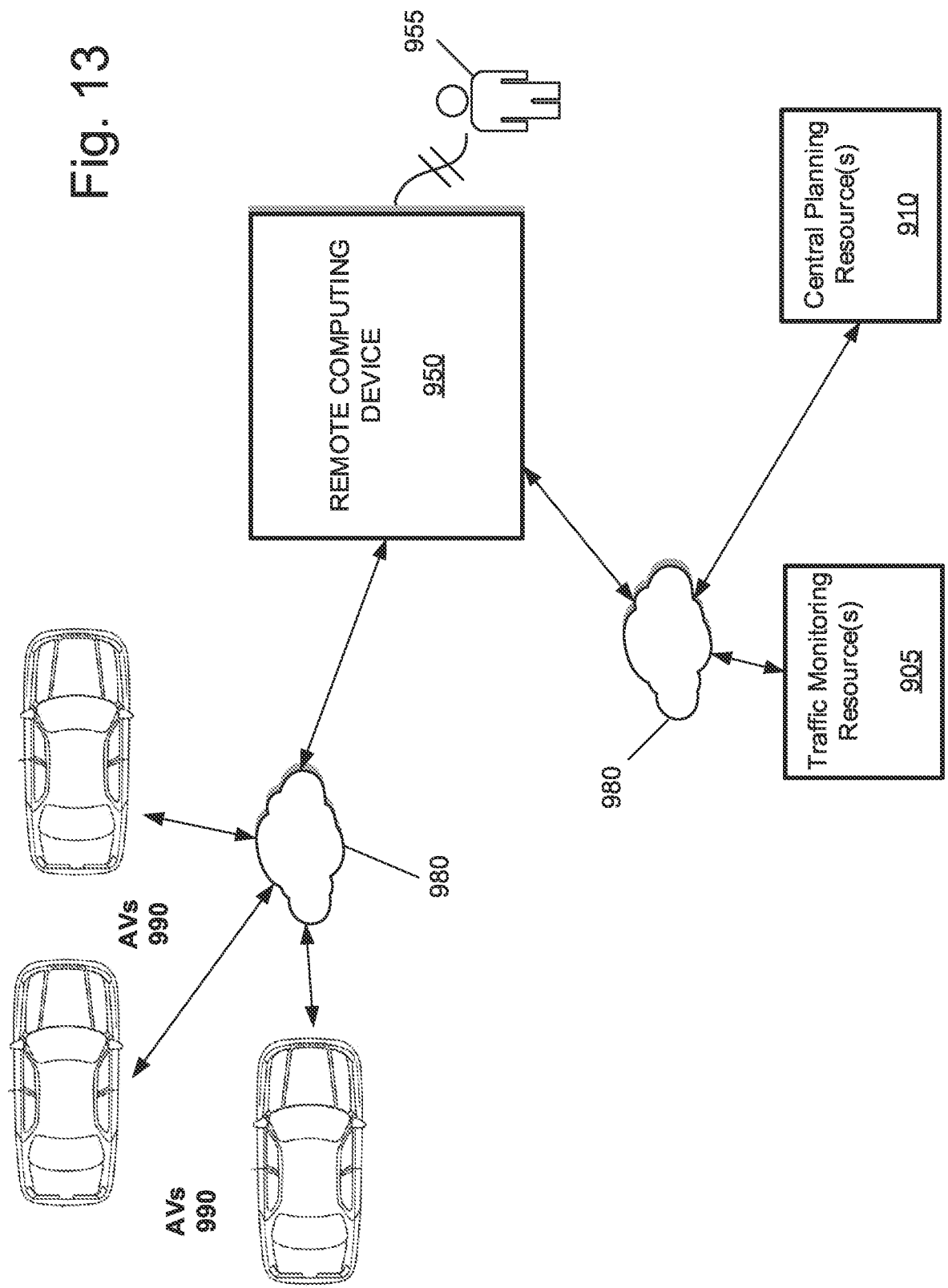
FIG. 13 depicts an example system for providing up-to-date route constraint information to autonomous vehicles according to example embodiments of the present disclosure.

FIG. 13 depicts an example system for providing up-to-date route constraint information to autonomous vehicles according to example embodiments of the present disclosure. In the below description of FIG. 13, the remote computing device 950 can correspond to the remote computing device 150 as shown and described with respect to FIG. 2, and throughout the present disclosure. Referring to FIG. 13, the remote computing device 950 can communicate with a fleet of autonomous vehicles 990 operating throughout a given region (e.g., a metropolitan area or predefined operational grid on a road network) over one or more networks 980. The remote computing device 950 can further communicate with one or more central planning resources 910 and/or one or more traffic monitoring resources 905 over one or more networks 980.

As described herein, the traffic monitoring resources 905 can monitor live traffic conditions for the given region and identify lane or road segments that are currently jammed with traffic, blocked, or otherwise inaccessible. The traffic monitoring resources 905 can be crowd-sourced or updated by users of a live traffic mapping resource or application, or can comprise a central monitoring service that continually updates traffic conditions on a granular level (e.g., every road segment of the given region). In some aspects, the traffic monitoring resources 905 can indicate the source for a live traffic constraint, as well as the road or lane segment(s) affected. In doing so, the traffic monitoring resources 905 can provide the remote computing device 950 with contextual information for the live traffic constraint. For example, the traffic monitoring resources 905 can classify the live traffic constraints in terms of type (e.g., normal traffic jam, vehicle incident, spontaneous or unplanned event), estimated time of resolution (e.g., less than ten minutes, between ten and thirty minute, or greater than thirty minutes), and/or size of the traffic constraint (e.g., whether multiple parallel road segments are constrained).

The central planning resources 910 may be updated by central planning authorities based on planned road and/or lane closures for the given region. For example, the central planning resources 910 can indicate permitted events requiring closure of a certain road segment during a certain time frame. Such permitted events can comprise parades, festivals, protests, road construction, utility servicing, and other planned events involving a road or lane closure.

In accordance with examples described herein, the remote computing device 950 update the autonomy map constraints for the given region based on the planned lane or road closures indicated by the central planning resources 910 and the live traffic constraints indicated by the traffic monitoring resources 905. In certain examples, the remote computing device 950 can be manually operated by an administrator 955. For manual implementations, the administrator 955 can manually access the traffic monitoring resources 905 and/or central planning resources 910 over one or more networks 980 to determine any traffic or road segment constraints for the given region. The administrator 955 may then manually update autonomy map constraints that dictate road and lane segments through which the autonomous vehicles 990 may operate.

In variations, the autonomy map constraints may be automatically updated by the remote computing device 950. For example, the remote computing device 950 can periodically or continuously parse through any live traffic constraints and planned road or lane closures indicated by the traffic monitoring resources 905 and central planning resources 910 to update the autonomy map constraints for the autonomous vehicles 990. For example, updating of the autonomy map constraints (automatically or manually) can correspond to establishing exclusion polygons for each of the traffic or road segment constraints identified by the traffic monitoring resources 905 or the central planning resources 910. The remote computing device 950 may then transmit traffic flow constraint information identifying the closed road or segments to the autonomous vehicles 990 over the network(s) 980. For example, the remote computing device 950 can generate a constraint file comprising the traffic flow constraint information indicating the excluded road segments, and transmit the constraint file to the autonomous vehicles 990 over the network(s) 980.

As described herein, the remote computing device 950 can transmit the traffic flow constraint information to all autonomous vehicles 990 or selectively. For example, the remote computing device 950 can manage an on-demand transport service that routes the autonomous vehicles 990 throughout the given region based on user demands (e.g., for freight delivery, food delivery, passenger transport, etc.). In such examples, the remote computing device 950 can selectively transmit the traffic flow constraint information to only those autonomous vehicles 990 that are routed to converge towards or intersect with the excluded road or lane segments.

Based on the traffic flow constraint information transmitted from the remote computing device 950, the autonomous vehicles 990 can perform route planning operations accordingly. For example, the remote computing device 950 or other transportation coordination system can provide the autonomous vehicles 990 with a sequence of destinations for making pick-ups and drop-offs. The on-board computing systems of the autonomous vehicles 990 can generate respective route plans to autonomously drive to a next destination. Based on the constraint file(s), comprising the traffic flow constraint information, received from the remote computing device 950, the autonomous vehicles 990 can inherently avoid the exclusion zones or forbidden road segments. Accordingly, the remote computing device 950 can leverage the live-traffic constraints and planned closures indicated by the traffic monitoring resources 905 and central planning resources 910 to create exclusion zones within the given region in which the autonomous vehicles 990 operate. The remote computing device 950 can then generate constraint files identifying the exclusion zones and transmit the constraint files to the autonomous vehicles.

Figure 14:
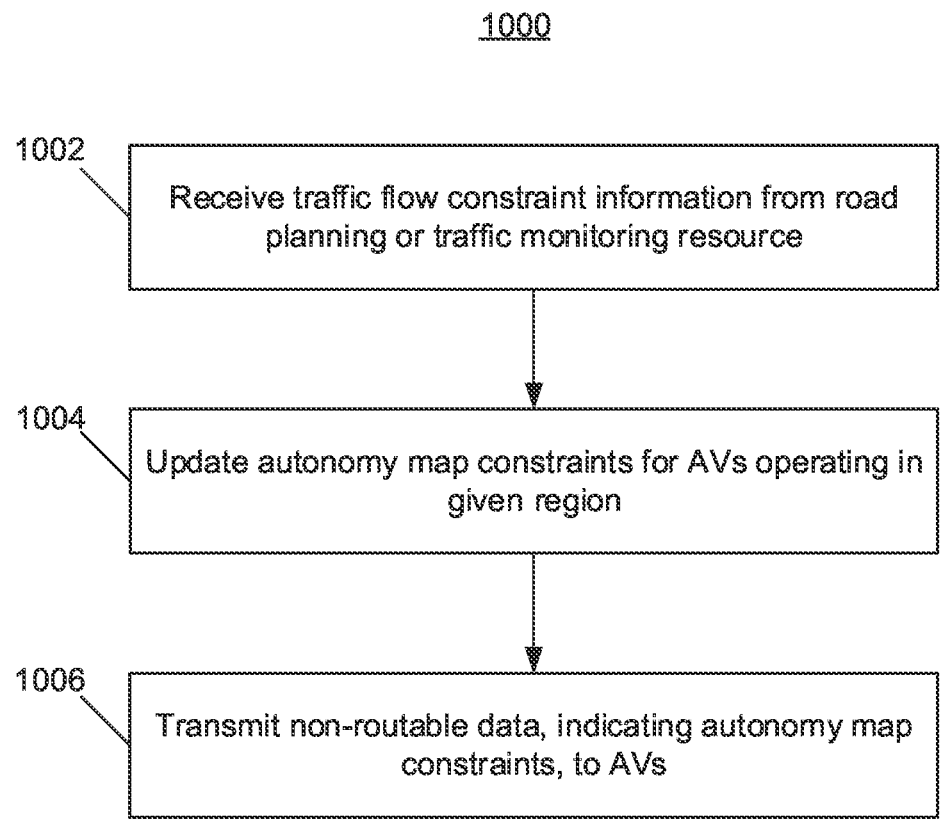
FIG. 14 depicts an example flow chart of a method of providing up-to-date route constraint information to autonomous vehicles according to example embodiments of the present disclosure.

FIG. 14 depicts an example flow chart of a method (1000) of providing up-to-date route constraint information to autonomous vehicles according to example embodiments of the present disclosure. One or more portion(s) of the method 1000 can be implemented by one or more computing devices such as, for example, the remote computing device(s) 150, 950 of FIGS. 2 and 13. In some examples, such remote computing device(s) can be included as part of a central control system that is in wireless communication with a plurality of autonomous vehicles, such as a fleet of autonomous vehicles providing one or more services (rideshare service, delivery service, courier service, etc.). Furthermore, in the below description of FIG. 14, reference may be made to reference characters representing like features as shown and described with respect to FIG. 13.

Referring to FIG. 14, the remote computing device 950 can receive or access traffic flow constraint information from one or more central road planning resources 910 and/or traffic monitoring resources 905 (1002). As described herein, the traffic flow constraint information may be accessed and received manually by an administrator 955 or automatically by the remote computing device 950. Based on the traffic constraint information, the remote computing device 950 can update autonomy map constraints for autonomous vehicles 990 operating in the given region (10004). As provided herein, the "autonomy map" can comprise a road grid within a road network on which the autonomous vehicles 990 can operate. In certain implementations, the autonomy map corresponds to on-board sub-maps or localization maps that the autonomous vehicles 990 utilize to compare with live sensor data. Accordingly, in updating the autonomy map constrains, the remote computing device 950 can generate exclusion polygons or areas that define forbidden road segments through which the autonomous vehicles 990 are forbidden to operate.

The remote computing device 950 may then generate and transmit non-routable data, indicating the autonomy map constraints, to the autonomous vehicles 990 (1006). In various examples described herein, the remote computing device 950 generates a constraint file that defines the non-routable data (e.g., identifying the lane or road segments that are closed or blocked), and transmits the constraint file to the autonomous vehicles 990. Thereafter, the autonomous vehicles 990 are prevented from planning routes that enter the forbidden road segments.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel. Furthermore, computing tasks discussed herein as being performed at computing device(s) remote from the vehicle can instead be performed at the vehicle (e.g., via the vehicle computing system), or vice versa. Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle comprising:
vehicle controls for propelling the autonomous vehicle;
one or more communication interfaces for wirelessly communicating with a remote computing system;
one or more processors;
a memory storing instructions that, when executed by the one or more processors, cause the one or more processors to:
   access map data comprising travel ways within a surrounding environment of the autonomous vehicle;
   obtaining a travel route to a destination location;
   receive, from the remote computing system, constraint data descriptive of a particular geographic area within the surrounding environment and a cost factor for navigating in the particular geographic area;
   generate a plurality of candidate motion plans for traveling within the surrounding environment;
   select, from the plurality of candidate motion plans, a motion plan for controlling the autonomous vehicle along the travel route, the motion plan selected using an optimization that considers the cost factor;

provide data indicative of the motion plan to a controller, wherein the controller is configured to translate the motion plan into control signals for at least one of a braking control component, a steering control component, or a speed control component and autonomously operate the vehicle controls to propel the vehicle according to the selected motion plan.

2. The autonomous vehicle of claim 1, wherein the cost factor is received in real time or near real time to account for an event encountered by the autonomous vehicle.

3. The autonomous vehicle of claim 1, wherein the constraint data is obtained from a remote operator using the remote computing system.

4. The autonomous vehicle of claim 1, wherein the cost factor corresponds to a portion of a travel way.

5. The autonomous vehicle of claim 4, wherein the portion of the travel way is a lane.

6. The autonomous vehicle of claim 1, wherein the operations comprise:
optimizing one or more variables of the motion plan using the cost factor.

7. The autonomous vehicle of claim 2, wherein the cost factor is associated with a traffic accident or a construction zone.

8. A non-transitory computer readable medium storing instructions that, when executed by one or more processors of an autonomous vehicle, cause the one or more processors to:
access map data comprising travel ways within a surrounding environment of the autonomous vehicle;
obtaining a travel route to a destination location;
receive, from a remote computing system, constraint data descriptive of a particular geographic area within the surrounding environment and a cost factor for navigating in the particular geographic area;
generate a plurality of candidate motion plans for traveling within the surrounding environment;
select, from the plurality of candidate motion plans, a motion plan for controlling the autonomous vehicle along the travel route, the motion plan selected using an optimization that considers the cost factor;
provide data indicative of the motion plan to a controller, wherein the controller is configured to translate the motion plan into control signals for at least one of a braking control component, a steering control component, or a speed control component and
autonomously operate the vehicle controls to propel the vehicle according to the selected motion plan.

9. The non-transitory computer readable medium of claim 8, wherein the cost factor is received in real time or near real time to account for an event encountered by the autonomous vehicle.

10. The non-transitory computer readable medium of claim 8, wherein the constraint data is obtained from a remote operator using the remote computing system.

11. The non-transitory computer readable medium of claim 8, wherein the cost factor corresponds to a portion of a travel way.

12. The non-transitory computer readable medium of claim 11, wherein the portion of the travel way is a lane.

13. The non-transitory computer readable medium of claim 8, wherein the instructions cause the one or more processors to:
optimize one or more variables of the motion plan using the cost factor.

14. The non-transitory computer readable medium of claim 9, wherein the cost factor is associated with a traffic accident or a construction zone.

15. A computer-implemented method of operating an autonomous vehicle, the method being performed by one or more processors and comprising:
accessing map data comprising travel ways within a surrounding environment of the autonomous vehicle;
obtaining a travel route to a destination location;
receiving, from a remote computing system, constraint data descriptive of a particular geographic area within the surrounding environment and a cost factor for navigating in the particular geographic area;
generating a plurality of candidate motion plans for traveling within the surrounding environment;
selecting, from the plurality of candidate motion plans, a motion plan for controlling the autonomous vehicle along the travel route, the motion plan selected using an optimization that considers the cost factor;
provide data indicative of the motion plan to a controller, wherein the controller is configured to translate the motion plan into control signals for at least one of a braking control component, a steering control component, or a speed control component and
autonomously operating the vehicle controls to propel the vehicle according to the selected motion plan.

16. The method of claim 15, wherein the cost factor is received in real time or near real time to account for an event encountered by the autonomous vehicle.

17. The method of claim 15, wherein the cost factor corresponds to a portion of a travel way.

18. The method of claim 17, wherein the portion of the travel way is a lane.

19. The method of claim 15, comprising:
optimizing one or more variables of the motion plan using the cost factor.

20. The method of claim 16, wherein the cost factor is associated with a traffic accident or a construction zone.

* * * * *

UNITED STATES PATENT AND TRADEMARK OFFICE
CERTIFICATE OF CORRECTION

PATENT NO. : 11,977,393 B2  
APPLICATION NO. : 17/144431  
DATED : May 7, 2024  
INVENTOR(S) : Nagy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 185 days.

Signed and Sealed this  
Eighth Day of October, 2024

Katherine Kelly Vidal  
*Director of the United States Patent and Trademark Office*